(12) United States Patent
Cataline et al.

(10) Patent No.: US 7,587,363 B2
(45) Date of Patent: *Sep. 8, 2009

(54) SYSTEM AND METHOD FOR OPTIMIZED FUNDING OF ELECTRONIC TRANSACTIONS

(75) Inventors: Glen R. Cataline, Dublin, OH (US); William Smith Rielly, Redmond, WA (US); Mark Robert Sheehan, Snoqualine, WA (US); William Scott Wallace, Downingtown, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/175,031

(22) Filed: Jun. 20, 2002

(65) Prior Publication Data

US 2003/0055783 A1 Mar. 20, 2003

Related U.S. Application Data

(63) Continuation-in-part of application No. 09/985,900, filed on Nov. 6, 2001.

(60) Provisional application No. 60/245,665, filed on Nov. 6, 2000, provisional application No. 60/378,060, filed on May 16, 2002, provisional application No. 60/354,308, filed on Feb. 7, 2002.

(51) Int. Cl.
*G06Q 40/00* (2006.01)
(52) U.S. Cl. .............................. 705/40; 705/39; 705/38; 705/35
(58) Field of Classification Search ............. 705/38–40, 705/42, 37, 14, 35; 382/137
See application file for complete search history.

(56) References Cited

U.S. PATENT DOCUMENTS 3,316,395 A 4/1967 Lavin (Continued)

FOREIGN PATENT DOCUMENTS

EP 0099999 7/1983

(Continued)

OTHER PUBLICATIONS

Visa & Carnegie Mellon Plan Online Payment Scheme, Newsbyte News Network, Feb. 15, 1995.

(Continued)

*Primary Examiner*—Stefanos Karmis
(74) *Attorney, Agent, or Firm*—Hunton & Williams

(57) ABSTRACT

The invention provides systems and methods for managing transactions. The system includes a data input portion that communicates first information regarding a payment request, as well as a decision reference data store for communicating second information regarding parameters for use in determining a payment option for the payment request. The system also includes a processor. The processor inputs the first information and the second information. Then, the processor selectably determines the payment option to direct a transmission of funds from at least one payment source to at least one payee account based on an optimization determination performed by the processor. The optimization determination may provide savings to the institution processing the transaction, or alternatively, may provide savings to the customer initiating the transaction, for example.

39 Claims, 9 Drawing Sheets

U.S. PATENT DOCUMENTS

| | | |
|---|---|---|
| 3,653,480 A | 4/1972 | Yamamoto |
| 4,205,780 A | 6/1980 | Burns |
| 4,264,808 A | 4/1981 | Owens et al. |
| 4,321,672 A | 3/1982 | Braun |
| 4,396,985 A | 8/1983 | Ohara |
| RE31,692 E | 10/1984 | Tyburski et al. |
| 4,495,018 A | 1/1985 | Vohrer |
| 4,594,663 A | 6/1986 | Hirayama |
| 4,617,457 A | 10/1986 | Granzow |
| 4,672,377 A | 6/1987 | Murphy |
| 4,694,397 A | 9/1987 | Grant et al. |
| 4,700,055 A | 10/1987 | Kashkashian |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,866,634 A | 9/1989 | Reboh |
| 4,931,793 A | 6/1990 | Fuhrmann et al. |
| 4,948,174 A | 8/1990 | Thomson et al. |
| 4,953,085 A | 8/1990 | Atkins |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Benton |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker |
| 5,206,803 A | 4/1993 | Vitagliano |
| 5,220,501 A | 6/1993 | Lawlor |
| 5,224,034 A * | 6/1993 | Katz et al. ............... 705/7 |
| 5,225,978 A | 7/1993 | Peterson |
| 5,237,159 A | 8/1993 | Stephens |
| 5,237,620 A | 8/1993 | Deaton |
| 5,239,462 A | 8/1993 | Jones |
| 5,262,941 A | 11/1993 | Saladin |
| 5,265,007 A | 11/1993 | Barnhard, Jr. et al. |
| 5,274,547 A | 12/1993 | Zoffel |
| 5,283,829 A | 2/1994 | Anderson |
| 5,287,269 A | 2/1994 | Dorrough |
| 5,311,594 A | 5/1994 | Penzias |
| 5,315,508 A | 5/1994 | Bain et al. |
| 5,321,238 A | 6/1994 | Kamata |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody |
| 5,367,581 A | 11/1994 | Abel |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,420,405 A | 5/1995 | Chasek |
| 5,424,938 A | 6/1995 | Wagner |
| 5,430,644 A | 7/1995 | Deaton |
| 5,432,506 A | 7/1995 | Chapman |
| 5,444,794 A | 8/1995 | Uhland |
| 5,444,841 A | 8/1995 | Glasser |
| 5,446,740 A | 8/1995 | Stratigos et al. |
| 5,448,471 A | 9/1995 | Deaton |
| 5,465,206 A | 11/1995 | Hilt |
| 5,477,040 A | 12/1995 | Lalonde |
| 5,479,494 A | 12/1995 | Clitherow |
| 5,479,532 A | 12/1995 | Abel |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar |
| 5,508,731 A | 4/1996 | Kohorn |
| 5,513,250 A | 4/1996 | McAllister |
| 5,532,464 A | 7/1996 | Josephson et al. |
| 5,537,314 A | 7/1996 | Kanter |
| 5,537,315 A | 7/1996 | Mitcham |
| 5,544,040 A | 8/1996 | Gerbaulet |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,644,727 A | 7/1997 | Atkins |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton |
| 5,659,741 A | 8/1997 | Eberhardt |
| 5,666,493 A | 9/1997 | Wojcik et al. |
| 5,677,955 A | 10/1997 | Doggett |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,696,907 A | 12/1997 | Tom |
| 5,699,527 A | 12/1997 | Davidson |
| 5,699,528 A | 12/1997 | Hogan |
| 5,703,344 A | 12/1997 | Bezy |
| 5,704,044 A | 12/1997 | Tarter et al. |
| 5,708,422 A | 1/1998 | Blonder |
| 5,710,889 A | 1/1998 | Clark |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Riach |
| 5,757,917 A | 5/1998 | Rose et al. |
| 5,774,553 A | 6/1998 | Rosen |
| 5,774,882 A | 6/1998 | Keen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,797,133 A | 8/1998 | Jones |
| 5,802,498 A | 9/1998 | Comesanas |
| 5,802,499 A | 9/1998 | Sampson et al. |
| 5,809,478 A | 9/1998 | Greco |

| | | | | | | |
|---|---|---|---|---|---|---|
| 5,819,236 | A | 10/1998 | Josephson | 6,035,281 A | 3/2000 | Crosskey et al. |
| 5,819,238 | A | 10/1998 | Fernholz | 6,035,285 A | 3/2000 | Schlect et al. |
| 5,823,463 | A | 10/1998 | Fissmann | 6,035,287 A | 3/2000 | Stallaert et al. |
| 5,826,241 | A | 10/1998 | Stein | 6,038,553 A | 3/2000 | Hyde |
| 5,826,245 | A | 10/1998 | Sandberg-Diment | 6,041,312 A | 3/2000 | Bickerton et al. |
| 5,832,447 | A | 11/1998 | Rieker | 6,041,315 A | 3/2000 | Pollin |
| 5,832,460 | A | 11/1998 | Bednar | 6,044,362 A | 3/2000 | Neely |
| 5,832,464 | A | 11/1998 | Houvener | 6,052,674 A | 4/2000 | Zervides et al. |
| 5,832,488 | A | 11/1998 | Eberhardt | 6,055,517 A | 4/2000 | Friend |
| 5,835,580 | A | 11/1998 | Fraser | 6,058,380 A | 5/2000 | Anderson et al. |
| 5,835,603 | A | 11/1998 | Coutts | 6,058,381 A | 5/2000 | Nelson |
| 5,835,899 | A | 11/1998 | Rose et al. | 6,061,665 A | 5/2000 | Bahreman |
| 5,845,256 | A | 12/1998 | Pescitelli | 6,064,764 A | 5/2000 | Bhaskaran et al. |
| 5,848,400 | A | 12/1998 | Chang | 6,065,675 A | 5/2000 | Teicher |
| 5,852,811 | A | 12/1998 | Atkins | 6,067,524 A | 5/2000 | Byerly et al. |
| 5,852,812 | A | 12/1998 | Reeder | 6,070,150 A * | 5/2000 | Remington et al. ........... 705/34 |
| 5,859,419 | A | 1/1999 | Wynn | 6,070,798 A | 6/2000 | Nethery |
| 5,864,609 | A | 1/1999 | Cross | 6,073,104 A | 6/2000 | Field |
| 5,870,456 | A | 2/1999 | Rogers | 6,073,113 A | 6/2000 | Guinan |
| 5,870,721 | A | 2/1999 | Norris | 6,076,072 A | 6/2000 | Libman |
| 5,870,723 | A | 2/1999 | Pare | 6,078,905 A | 6/2000 | Pich-LeWinter |
| 5,870,725 | A | 2/1999 | Belinger | 6,078,907 A | 6/2000 | Lamm |
| 5,873,072 | A | 2/1999 | Kight | 6,081,790 A | 6/2000 | Rosen |
| 5,875,437 | A | 2/1999 | Atkins | 6,085,168 A | 7/2000 | Mori et al. |
| 5,878,141 | A | 3/1999 | Daly et al. | 6,088,683 A | 7/2000 | Jalili |
| 5,878,403 | A | 3/1999 | Agrawal | 6,088,685 A | 7/2000 | Kiron et al. |
| 5,883,810 | A | 3/1999 | Franklin | 6,088,686 A | 7/2000 | Walker et al. |
| 5,884,285 | A | 3/1999 | Atkins | 6,092,056 A | 7/2000 | Tull, Jr. et al. |
| 5,884,288 | A | 3/1999 | Chang | 6,098,053 A | 8/2000 | Slater |
| 5,884,290 | A | 3/1999 | Smorodinsky et al. | 6,098,070 A | 8/2000 | Maxwell |
| 5,897,621 | A | 4/1999 | Boesch | 6,105,011 A | 8/2000 | Morrison |
| 5,897,625 | A | 4/1999 | Gustin | 6,108,639 A | 8/2000 | Walker et al. |
| 5,898,157 | A | 4/1999 | Mangili et al. | 6,108,644 A | 8/2000 | Goldschlag |
| 5,903,881 | A | 5/1999 | Schrader | 6,110,044 A | 8/2000 | Stern |
| 5,910,896 | A | 6/1999 | Hahn-Carlson | 6,111,858 A | 8/2000 | Greaves |
| 5,910,988 | A | 6/1999 | Ballard | 6,115,690 A | 9/2000 | Wong |
| 5,911,135 | A | 6/1999 | Atkins | 6,119,106 A | 9/2000 | Mersky et al. |
| 5,911,136 | A | 6/1999 | Atkins | 6,119,107 A | 9/2000 | Polk |
| 5,917,965 | A | 6/1999 | Cahill et al. | 6,125,354 A | 9/2000 | MacFarlane et al. |
| 5,920,847 | A | 7/1999 | Koilling | 6,128,602 A | 10/2000 | Northington et al. |
| 5,930,776 | A | 7/1999 | Dykstra | 6,128,603 A * | 10/2000 | Dent et al. .................... 705/40 |
| 5,930,778 | A | 7/1999 | Geer | 6,129,273 A | 10/2000 | Shah |
| 5,940,811 | A | 8/1999 | Norris | 6,138,118 A | 10/2000 | Koppstein et al. |
| 5,940,844 | A | 8/1999 | Cahill | 6,144,946 A | 11/2000 | Iwamura |
| 5,943,656 | A | 8/1999 | Crooks | 6,148,293 A | 11/2000 | King |
| 5,945,653 | A | 8/1999 | Walker | 6,149,055 A | 11/2000 | Gatto |
| 5,956,700 | A | 9/1999 | Landry | 6,149,056 A | 11/2000 | Stinson |
| 5,963,659 | A | 10/1999 | Cahill et al. | 6,173,272 B1 | 1/2001 | Thomas et al. |
| 5,963,925 | A | 10/1999 | Kolling et al. | 6,181,837 B1 | 1/2001 | Cahill et al. |
| 5,966,698 | A | 10/1999 | Pollin | 6,185,544 B1 | 2/2001 | Sakamoto et al. |
| 5,966,699 | A | 10/1999 | Zandi | 6,202,054 B1 | 3/2001 | Lawlor et al. |
| 5,970,483 | A | 10/1999 | Evans | 6,205,433 B1 * | 3/2001 | Boesch et al. ................. 705/26 |
| 5,978,780 | A | 11/1999 | Watson | 6,216,115 B1 | 4/2001 | Barrameda |
| 5,983,206 | A | 11/1999 | Oppenheimer | 6,227,447 B1 | 5/2001 | Campisano |
| 5,987,435 | A | 11/1999 | Weiss et al. | 6,233,565 B1 | 5/2001 | Lewis et al. |
| 5,987,436 | A | 11/1999 | Halbrook | 6,233,566 B1 | 5/2001 | Levine et al. |
| 5,987,439 | A | 11/1999 | Gustin et al. | 6,236,972 B1 | 5/2001 | Shkedy |
| 5,991,750 | A | 11/1999 | Watson | 6,240,444 B1 | 5/2001 | Fin et al. |
| 5,995,947 | A | 11/1999 | Fraser | 6,278,981 B1 | 8/2001 | Dembo et al. |
| 6,000,832 | A | 12/1999 | Franklin et al. | 6,289,322 B1 * | 9/2001 | Kitchen et al. ................ 705/40 |
| 6,003,762 | A | 12/1999 | Hayashida | 6,292,789 B1 | 9/2001 | Schutzer |
| 6,006,208 | A | 12/1999 | Forst | 6,298,335 B1 | 10/2001 | Bernstein |
| 6,009,442 | A | 12/1999 | Chen et al. | 6,301,379 B1 * | 10/2001 | Thompson .................. 382/137 |
| 6,012,044 | A | 1/2000 | Maggioncalda | 6,304,858 B1 | 10/2001 | Mosler et al. |
| 6,014,636 | A | 1/2000 | Reeder | 6,321,212 B1 | 11/2001 | Lange |
| 6,014,646 | A | 1/2000 | Vallee | 6,324,524 B1 | 11/2001 | Lent et al. |
| 6,016,482 | A | 1/2000 | Molinari et al. | 6,338,047 B1 | 1/2002 | Wallman |
| 6,016,484 | A | 1/2000 | Williams et al. | 6,338,049 B1 | 1/2002 | Walker et al. |
| 6,018,718 | A | 1/2000 | Walker et al. | 6,339,766 B1 | 1/2002 | Gephart |
| 6,026,388 | A | 2/2000 | Liddy | 6,343,279 B1 | 1/2002 | Bissonette |
| 6,029,139 | A * | 2/2000 | Cunningham et al. ......... 705/10 | 6,363,164 B1 | 3/2002 | Jones et al. |
| 6,032,133 | A | 2/2000 | Hilt et al. | 6,363,364 B1 | 3/2002 | Nei |
| 6,032,137 | A | 2/2000 | Ballard | 6,363,365 B1 | 3/2002 | Kou |

| | | |
|---|---|---|
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,446,072 B1 | 9/2002 | Schulze et al. |
| 6,490,568 B1 * | 12/2002 | O'Mara ............... 705/39 |
| 6,493,685 B1 | 12/2002 | Ensel et al. |
| 6,535,896 B2 | 3/2003 | Britton et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,615,190 B1 | 9/2003 | Slater |
| 6,629,081 B1 | 9/2003 | Cornelius et al. |
| 6,636,615 B1 | 10/2003 | Rhoads et al. |
| 6,658,393 B1 * | 12/2003 | Basch ............... 705/38 |
| 6,704,714 B1 | 3/2004 | O'Leary et al. |
| 6,721,715 B2 | 4/2004 | Nemzow |
| 6,728,397 B2 | 4/2004 | McNeal |
| 6,825,940 B1 | 11/2004 | Wu et al. |
| 6,860,375 B2 | 3/2005 | Hallowell et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,855 B2 | 11/2005 | Das et al. |
| RE38,957 E | 1/2006 | Laussermair et al. |
| 6,999,943 B1 * | 2/2006 | Johnson et al. ............... 705/39 |
| 7,062,456 B1 | 6/2006 | Riehl et al. |
| 7,104,443 B1 | 9/2006 | Paul et al. |
| 7,177,836 B1 | 2/2007 | German et al. |
| 7,200,255 B2 | 4/2007 | Jones et al. |
| 7,313,543 B1 | 12/2007 | Crane et al. |
| 2001/0011255 A1 | 8/2001 | Asay |
| 2001/0018666 A1 | 8/2001 | Sugiyama et al. |
| 2001/0018739 A1 | 8/2001 | Anderson |
| 2001/0032139 A1 | 10/2001 | Debonnet, Jr. |
| 2001/0037309 A1 | 11/2001 | St. Vrain |
| 2001/0042034 A1 | 11/2001 | Elliott |
| 2001/0047313 A1 | 11/2001 | Kanai |
| 2001/0047334 A1 | 11/2001 | Nappe et al. |
| 2001/0047489 A1 | 11/2001 | Ito |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0048369 A1 | 4/2002 | Ginter |
| 2002/0052842 A1 | 5/2002 | Schuba |
| 2002/0055907 A1 | 5/2002 | Pater et al. |
| 2002/0062282 A1 * | 5/2002 | Kight et al. ............... 705/40 |
| 2002/0062285 A1 | 5/2002 | Amann |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0087415 A1 | 7/2002 | Allen et al. |
| 2002/0087468 A1 | 7/2002 | Ganesan |
| 2002/0087469 A1 | 7/2002 | Ganesan et al. |
| 2002/0091635 A1 | 7/2002 | Dilip |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0037002 A1 | 2/2003 | Higgins et al. |
| 2003/0046218 A1 | 3/2003 | Albanese et al. |
| 2003/0097335 A1 | 5/2003 | Muskowitz et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0133516 A1 | 7/2003 | Alamouti et al. |
| 2003/0182230 A1 | 9/2003 | Pessin |
| 2003/0187789 A1 | 10/2003 | Karas et al. |
| 2003/0191710 A1 | 10/2003 | Green et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 * | 4/2004 | Talbert et al. ............... 705/40 |
| 2004/0201735 A1 | 10/2004 | Baron |
| 2004/0228514 A1 | 11/2004 | Houle et al. |
| 2005/0033690 A1 | 2/2005 | Antognini et al. |
| 2005/0097050 A1 | 5/2005 | Orcutt |
| 2005/0177480 A1 | 8/2005 | Huang |
| 2006/0106650 A1 | 5/2006 | Bush |
| 2006/0178986 A1 | 8/2006 | Giordano et al. |

FOREIGN PATENT DOCUMENTS

| | | |
|---|---|---|
| EP | 0421808 | 4/1991 |
| EP | 1014318 | 6/2000 |
| JP | 2001266039 | 9/2001 |
| JP | 2002024618 | 1/2002 |
| WO | WO 97/45796 | 4/1991 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

PCT-international Search Report dated Jan. 25, 2002, for Application No. PCT/US01/42743, filed Nov. 6, 2001.

Annual Report Pursuant to Section 13 or 15(d) of the Securities Exchange Act of 1934, Intelidata Technologies Corporation, Commission File No. 000-21685, pp. 1-10 (out of 55). Fiscal year ended Dec. 31, 2001.

Technology, *In Brief: Wachovia-InteliDate Deal*, Tuesday, May 7, 2002.

French, Kristen, Tech Stocks: Market Movers, *Investor9 Worry CheckFree Being Chased from Its Own Game* Jun. 20, 2002, pp. 1-4.

Money, Initial Launch to 200 Credit Unions, Jun. 27, 2002, pp. 1-3.

Bills, Steve, Technology, "*Chase Pact Done, What's Next for Web Vendors?*" Jun. 3, 2002, p. 23. (3 pages).

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying By Credit Card—Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

Zuckerman, The Hedge-Fund Craze, The Wall Street Journal, Jun. 12, 2002.

McDonald, The Stars in the Sky Flicker, And Fund Stars Do the Same, The Wall Street Journal, Jan. 15, 2003.

Financial News, Wells Fargo Rolls Out Nationwide Lockbox Check Conversion, PR Newswire Association, Apr. 22, 2003.

U.S. Appl. No. 09/860,176, filed Sep. 4, 2001, and the art cited therein, Knight.

O. O'Mahony, Electronic Payment System. 1997. Artech House, Boston London, XP002137265, pp. 7-11.

Terrie Miller and Henry Yan, When Custody Governs, Benefits Canada, Toronto, Feb. 1998, vol. 22, Issue 2, p. 33, 5 pages.

Visa & Carnegie Mellon Plan Online Payment Scheme; Newsbyte News Network; Feb. 15, 1995.

Maturi et al.; Personal Finance; When You Need to Send Cash in a Flash; The New York Times; p. A7; Sep. 25, 1988.

Armstrong; Norwest Eases Difficulty of Interstate Banking Bank's Customers May Use the Same Account Number at any Branch; Milwaukee Journal Sentinel; p. 2; Oct. 12, 1995.

Hunt; An Introduction to the Economics of Payment Card Networks; Review of Network Economics, vol. 2; Issue 2; Jun. 2003.

* cited by examiner

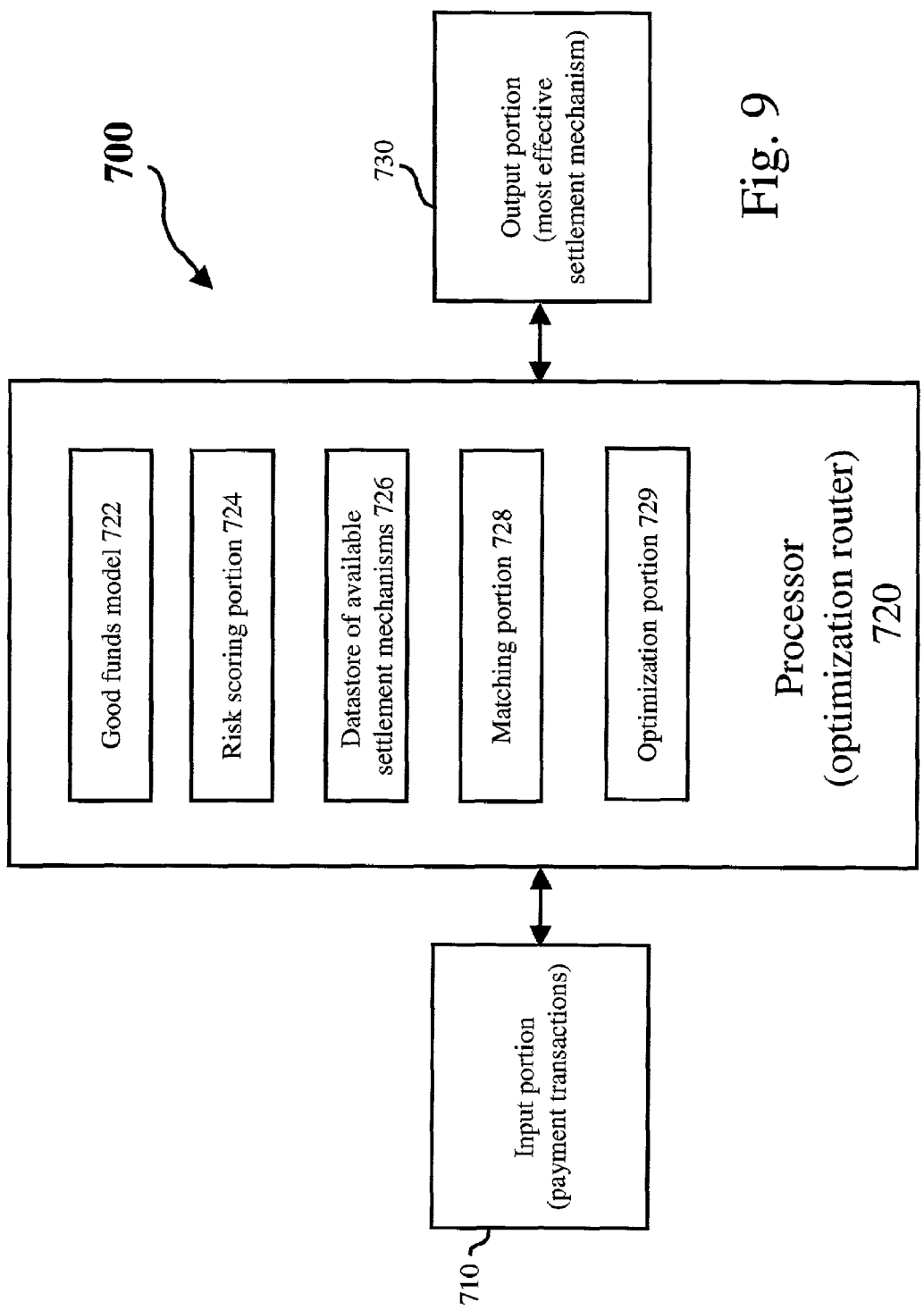

SYSTEM AND METHOD FOR OPTIMIZED FUNDING OF ELECTRONIC TRANSACTIONS

CROSS REFERENCE TO RELATED APPLICATIONS

This application is a continuation-in part application of application U.S. Ser. No. 09/985,900 filed Nov. 6, 2001, which application is incorporated by reference in its entirety. Application U.S. Ser. No. 09/985,900 is related to the subject matter of provisional application U.S. Ser. No. 60/245,665 filed Nov. 6, 2000, assigned or under obligation of assignment to the same entity as this application, from which application priority is claimed by the application U.S. Ser. No. 09/985,900. Application U.S. Ser. No. 09/985,900 and provisional application U.S. Ser. No. 60/245,665 are each incorporated herein by reference in their entirety.

The subject matter of this application is related to the subject matter of provisional application U.S. Ser. No. 60/354,308 filed Feb. 7, 2002, assigned or under obligation of assignment to the same entity as this application, from which application priority is claimed for the present application. Provisional application U.S. Ser. No. 60/354,308 is incorporated herein by reference in its entirety.

Further, the subject matter of this application is related to the subject matter of provisional application U.S. Ser. No. 60/378,060 filed May 16, 2002 assigned or under obligation of assignment to the same entity as this application, from which application priority is claimed for the present application. Provisional application U.S. Ser. No. 60/378,060 filed May 16, 2002 is incorporated herein by reference in its entirety.

FIELD OF THE INVENTION

The invention relates generally to electronic commerce, and more particularly to systems and methods for selectively performing payment and other transactions from a variety of sources and according to selectable criteria, while optimizing those transactions for benefits to an entity requesting the transaction an/or an entity through which the transaction is processed.

BACKGROUND OF THE INVENTION

Electronic commerce, such as personal banking via the Internet, has become increasingly popular. Many electronic banking applications enable a user to perform banking related transactions from home, such as through a personal computer, browser-equipped cellular phone, electronic wallet (both client side and server side) or other client device. Using the client device, a user may manipulate a graphical user interface to transfer funds between accounts, direct a wire payment to a third party, redeem securities or perform other transaction functions.

Electronic banking may however suffer from the drawback that it is difficult for a user to manipulate and move funds when and how the person desires. Some systems require a user to access multiple graphic user interface screens to effectuate the transfer of money, even from just one source account to just one recipient. These access requirements, possibly including repeated logins, may lengthen the process and cause user confusion, thereby discouraging a user from accessing the service.

Electronic banking may also suffer the drawback of defaulting to a payment mechanism which may not be the most efficient or cost effective manner for achieving various transactions. For example, some methods for transferring funds may be more expensive than others. A balance transfer transaction using a credit card account as a source of payment which is executed at a cost of, for example, 3% of balance may be more expensive than an ACH transfer, or transmitting a personal or certified check or postal or bank money order to satisfy the same credit card or other bill.

The host financial institution, acting as the payment enabler to the transaction, may therefore absorb different internal costs depending on the payment mechanism chosen by the user, or to which the transaction defaults. The consumer may in cases see those differing transaction costs reflected in different fees charged to them.

Moreover some financial institutions, from the point of view of internal operations, consider certain categories of funds transfer, including the Automated Clearing House (ACH) and wire transfer, as risky since authenticating the identity of the customer may be difficult or impossible. However security criteria may not always be factored into transaction defaults or rules. Other parameters, such as contractual obligations such as minimums with different payment providers, possible volume discounts, tiered rewards thresholds and others may not be taken into account in the ordinary routing of transactions.

The consumer, business or other payment initiator for their part may need to be aware of various payment mechanisms and the costs associated with each method of delivering payment to determine the most cost-effective way of transmitting funds, without assistance from the electronic payment system itself.

Fulfillment services may therefore be more expensive for providers and users than necessary, and less expedient or secure than they could be.

Further, many financial institutions such as banks, credit card companies, mortgage companies, securities houses and other entities contract with a single third party bill payment provider to have bills presented and paid on their behalf using bill pay platforms. Typically the Web site or telephone bill pay products are branded by the provider to represent the financial institution. In some cases the financial institution maintains the user interface but in other cases, the bill payment provider provides the user interface. Examples of bill payment providers include CheckFree, Spectrum, ePrinceton Telecom, M&I and others.

In addition, in most cases only one bill payment provider can be used at one time or by one customer due to a financial institution's inability to provide a consolidated view of the various bill payment and transfer methods. Usage of multiple bill payment services and transfers may cause further confusion for the customer, and the institution's customer care team.

An integrated, programmable and optimizing technique for managing various fund transfers and other transaction, and providing tracking to the customer and customer service representative, is not available. Other drawbacks exist in known processes and systems.

SUMMARY OF THE INVENTION

The invention provides systems and methods for managing transactions. The system includes a data input portion that communicates first information regarding a payment request, as well as a decision reference data store for communicating second information regarding parameters for use in determining a payment option for the payment request. The system also includes a processor. The processor inputs the first information and the second information. Then, the processor selectably determines the payment option to direct a transmission of funds from at least one payment source to at least one payee account based on an optimization determination performed by the processor.

BRIEF DESCRIPTION OF THE DRAWINGS

FIG. 9 is a block diagram showing a payment system including an optimizer in accordance with one embodiment of the invention.

DETAILED DESCRIPTION OF PREFERRED EMBODIMENTS

Hereinafter, aspects of systems and methods of the invention in accordance with various embodiments will be described. As used herein, any term in the singular may be interpreted to be in the plural, and alternatively, any term in the plural may be interpreted to be in the singular.

The systems and methods of the invention are directed to the above stated problems, as well as other problems, that are present in conventional techniques. The foregoing description of various products, methods, or apparatus and their attendant disadvantages described in the "Background of the Invention" is in no way intended to limit the scope of the invention, or to imply that the invention does not include some or all of various elements of known products, methods, and/or apparatus in one form or another. Indeed, various embodiments of the invention may be capable of overcoming some of the disadvantages noted in the "Background of the Invention," while still retaining some or all of the various elements of known products, methods, and apparatus in one form or another.

The invention provides systems and methods for selectable funding or adaptable routing of transactions, including electronic and other transactions, which enables a payment initiator such as a consumer, business or government entity to select, schedule, maintain and optimize the timing and technique used to effect various payments, including scheduling bill payments on time and at "least cost" to the payment enabler or payment initiator.

In one regard, the invention may permit a payment initiator to transparently enjoy the benefits of optimization, once payment schedules and other data are input, since the system arranges for the best available delivery mechanism to satisfy the scheduled payment obligations automatically. The invention may furthermore achieve economies for the bank or other participating institution, since payment sourcing and routing may be optimized at the level of the payment enabler, as well as for the consumer. The invention in another regard may increase the range and flexibility of available funding sources, as well as recipients, using an integrated mediation engine.

Figure 1:
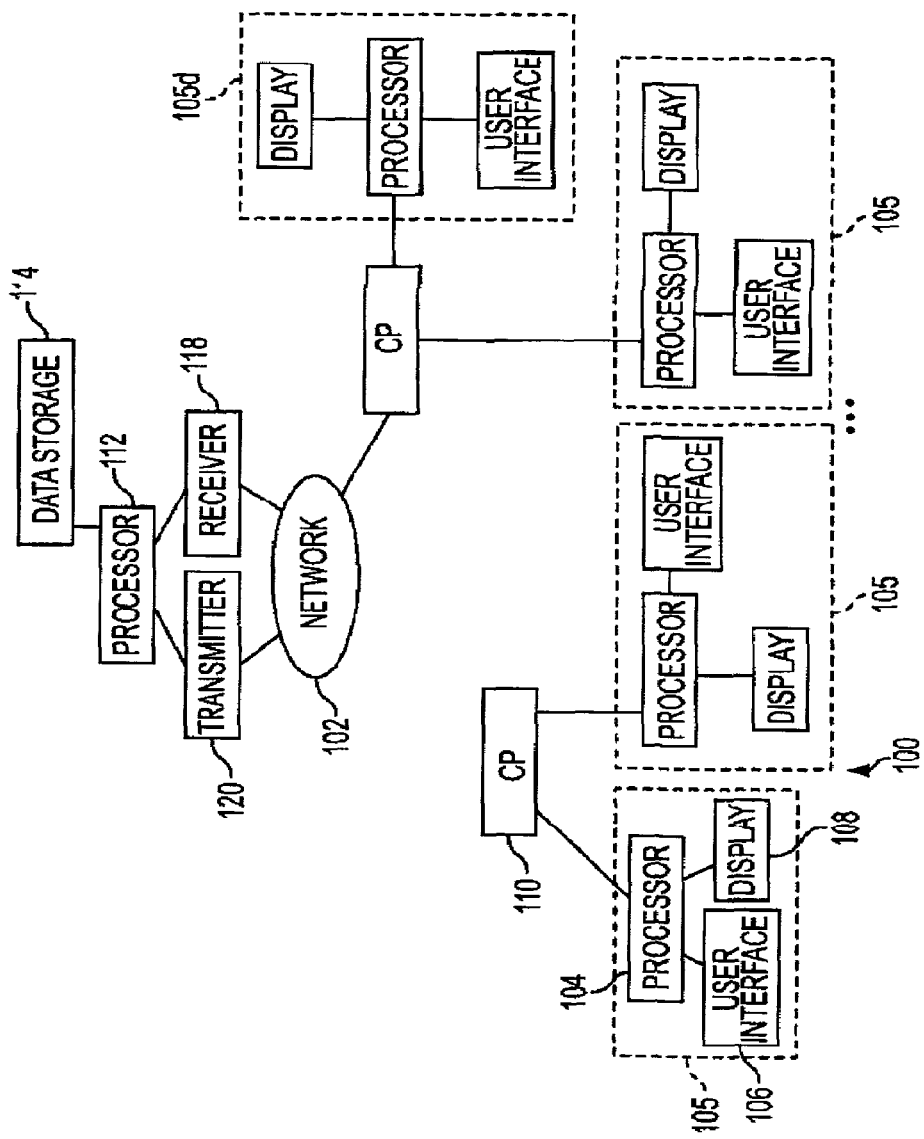
FIG. 1 is a schematic representation of a system for transferring funds according to one embodiment of the invention.

As shown in FIG. 1, the payment system 100 of the invention in one regard provide a consumer, business or other payment initiator with an integrated interface with which to manage the programmable payment of a number of types of bill and other payments from diverse sources of funds on an optimized basis.

For instance, using the payment system 100 of the invention the payment initiator may schedule electronic, paper or other payments to, for instance, a mortgage account, a car finance or lease account, credit card or merchant card accounts, utility accounts, contribution accounts such as 401 (k) or educational or charitable accounts, or other accounts or recipients through an integrated and relatively streamlined interface. The invention in another regard may interface to conventional software packages, such as personal finance managers (PFMs) or others as a front end, to increase ease of use for consumers, businesses and other payment initiators familiar with those tools.

The payment initiator may schedule those funds transfers from a variety of source accounts, such as checking or other demand deposit accounts (DDAs), money market funds, securities accounts, stored value accounts, other credit card accounts, currency accounts, overdraft lines of credit, micro payment accounts, lines or credit or other accounts or facilities which may act as a source of funds.

The payment system 100 of the invention in an embodiment provides a flexible, one-view interface to all of the possible sources and recipients of one-time or recurring funds transfers. The payment initiator may therefore view and manage all their transactions without resorting to multiple platforms or performing multiple authentications.

In another regard, the payment system 100 of the invention may automatically drive transactions from source funds to recipient accounts using the most efficient transfer mechanism available for the payment the user has selected. For instance, a payment initiator may select to have a payment made on a credit card account by way of a check or other payment or instrument drawn on a deposit account by a certain day of the month while maintaining funds availability for the longest possible time.

The payment system 100 of the invention may then analyze the costs and delivery timeline for that fund transfer to effectuate the most optimal available transfer. Factors taken into account to optimize the transaction may include the identity of the payee as the funding destination (such as a credit card provider), the delivery timeline (such as the number of days until the payment must be made), the funding source (such as a financial institution providing a direct deposit account), and any third party providers having a relationship with the funding source, including identifying those that offer rewards or other benefits that accrue through a channel.

Other optimization factors or rules may include costs to the payment initiator and to the bank or other host entity, contractual or other account minimums, the reliability of the payment channel, dollar amount (e.g. micropayments or macropayments), any discounts for quantity of transactions or amounts of transactions, and other rules-based intelligence. In an embodiment of the invention, the payment system 100 may also aggregate multiple payment transactions to increase efficiency, such as for instance aggregating all of one payment initiator's payments to a single large bank for a month, or the transactions of multiple customers to realize rewards leverage, economies of scale or other benefits.

Other factors accounted for in performing an optimized calculation include the type or category of payee, payment thresholds, tiered rewards or other graduated benefits, the type and nature of any intermediary account used to effect the transaction, and others. Two or more of a payment source, intermediary and a payee for instance may be identified as both belonging to the same association or network, permitting efficiencies to be realized when remaining within the association or network. The factors and rules taken into account may be modified over time to reflect changing market conditions, refinements to the transaction model and other evolving criteria.

As a result, the payment system 100 may determine that the funding destination, such as a revolving credit account provider, is a member of a third party association with which the funding source subscribes or otherwise has access to, such as the commercially available Spectrum service. As a result, the cost of the scheduled payment may be reduced by routing the payment through the common association (such as Spectrum or others) with the payee, rather than routing the transaction through a default payment provider outside the association.

By contrast, the payment system 100 may determine that the payee account and the funding source, or the host entity itself, are part of the same organization. In this instance, an internal transfer may be determined to be the most cost efficient mechanism for effecting payment, without resort to any external payment network. Costs may be reduced for both payment initiator and payment enabler, in that scenario.

In operation, as illustrated in FIG. 1, consumers, businesses, government entities and other payment initiators may use one or more clients 105 to access the payment system 100 through network 102, for instance through multiple connector providers (CPs) 110 such as Internet service providers (ISPs) or others.

According to an embodiment of the invention, the clients 105 may be or include, for instance, a personal computer running Microsoft Windows™ 9x, Millenium™, NT™, 2000 or XP™, Windows™CE™, MacOS™, PalmOS™, Unix, Linux, Solaris™, OS/2™. Clients 105 may also be or include a network-enabled appliance such as a WebTV™ unit, radio-enabled Palm™ Pilot or similar unit, a set-top box, a networkable game-playing console such as Sony Playstation™, Sega Dreamcast™ or Microsoft XBox™, a browser-equipped or other network-enabled cellular telephone, an automated teller machine (ATM), an electronic wallet (client side or server side), or other TCP/IP client or other device, or a stand-alone Website offering. Client 105 may yet further be, include or interface to character recognition platforms or voice recognition platforms or other channels.

Network 102 may be, include or interface to any one or more of, for instance, the Internet, an intranet, a LAN (Local Area Network), a WAN (Wide Area Network) a digital T1, T3, E1 or E3 line, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or other connection. Network 102 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth, BlueTeeth or WhiteTooth radio link, or an IEEE 802.11 (Wi-Fi)-based radio frequency link. Network 102 may yet further be, include or interface to any other wired or wireless, digital or analog interface or connection.

Connection provider 110 may be or include a provider that connects the requesters to the network 102. For example, connection provider 110 may be or include an internet service provider (ISP), a virtual private network (VPN), an intranet, a dial-up access device such as a modem, or other manner of connecting to network 102.

FIG. 1 illustrates four clients 105 connected to network 102 through two connection providers 110, but it will be understood that in practice less or significantly more users may be connected or connectable to payment system 100 than shown in FIG. 1, including through one or more connection providers 110.

The payment system 100 may include a processor 112, which may also have a connection to the network 102. Processor 112 may communicate with one or more data storage modules 114, discussed in more detail below.

Each of clients 105 used by payment initiators to manipulate payments and accounts may contain a processor module 104, a display module 108, and a user interface module 106. Each of clients 105 may have at least one user interface module 106 for interacting and controlling the computer. The user interface module 106 may be, include or interface to one or more of a keyboard, joystick, touchpad, mouse, scanner or similar device or combination of devices. In an embodiment, the display module 108 may be or include a graphical user interface (GUI) to input data and conduct other transaction tasks.

The processor 112 may maintain a connection to the network 102 through transmitter module 118 and receiver module 120. Transmitter module 118 and receiver module 120 may be or include conventional devices which enable processor 112 to interact with network 102. According to an embodiment of the invention, transmitter module 118 and receiver module 120 may be integral with processor 112. The connection to network 102 by processor 112 and clients 105 may be a broadband connection, such as through a T1 or T3 line, a cable connection, a telephone line connection, DSL connection, or other type connection.

Processor 112 functions to communicate with clients 105 and permit clients 105$s$ to interact with each other in connection with transaction services, messaging services and other services which may be provided through payment system 100.

The processor 112 may communicate with a number of data storage modules 114. Each of data storage module 114$s$ may store various information associated with the payment platform, including administrator data, received instructions, transaction logs or other files or other information. According to an embodiment of the invention, each of data storage module 114$s$ may be located on one or more data storage devices, where the data storage devices are combined or separate from processor 112. Each of data storage modules 114 may be, include or interface to, for example, the Oracle™ relational database sold commercially by Oracle Corp. Other databases, such as Informix™, DB2 (Database 2), Sybase™ or other data storage or query formats, platforms or resources such as OLAP (On Line Analytical Processing), SQL (Standard Query Language), a storage area network (SAN), Microsoft Access™ or others may also be used, incorporated or accessed in the invention. Each of data storage modules 114 may be supported by server or other resources, and may in embodiments include redundancy, such as a redundant array of independent disks (RAID), for data protection.

While a supporting architecture has been described, it will be understood that other architectures could support the operation of payment system 100. In general, the payment system 100 is designed to allow financial and other payment initiators to be able to pay bills and transfer funds when and where they want, in a selectable, integrated and optimized manner.

The payment system 100 of the invention in one regard permits a financial institution or other payment enabler to consolidate and aggregate the movement of money via the Internet, at in-person branch visits, at retail or other kiosks, over the telephone or other network, for example, and provide one view to the payment initiator. In an embodiment, a view may also be provided to a call center representative. According to an embodiment of the invention, the payment initiator may be provided with a cumulative total of bills paid and transfers made both in and out for a term defined by the payment initiator (e.g. daily, weekly, monthly, quarterly, annually). Optimizations may be executed on scheduled transactions to minimize cost or maximize float, or manage other variables.

For example, parameters can be established to allow the payment initiator to automatically pay a bill and/or transfer funds without further any involvement based on desired payment date, payment recipient such as a merchant, bank or other account holder, the dollar amount of the transaction, the source of the transaction funds, and other variables. By way of example, a payment initiator may designate that the electricity bill should be paid on the due date for a given month, to avoid a significant late fee by the utility or other entity or a surcharge applied by commercial wire delivery services. Same-day payment may be programmed for other accounts with timing sensitivity, for instance mortgage payments. The payments scheduled according to various tiers of timing may, in embodiments of the invention, be offered to the consumer or other payment initiator at different levels of costs, depending on urgency.

The payment system 100 may also allow the payment initiator to select a prospective time frame in which the payment shall be made. The time frame may be, for example, besides or adjacent the same day, the next day, next week, specified date, an offset from a bill date (e.g. 2 days before due), or other designated payment windows. The payment system 100 may have an open architecture that supports various interfaces between a server or Web site and host systems such as ACH/NACHA, Wire, RPS, OFX or other protocols.

The ACH network, or automated clearing house, as administered by the NACHA, may for example provide a payment initiator with the ability to transfer funds over the ACH network. Wire transfers, which transfer funds immediately, but at a significantly greater cost than the ACH network, may also be designated by a payment initiator. A remittance process system (RPS) protocol, designed by MasterCard®, or an open financial exchange (OFX) protocol, designed by Intuit, CheckFree, and Microsoft, may also be used to transfer financial information. Other protocols may be employed.

According to an embodiment of the invention, an optimization function may be used by payment system 100 to optimize the transfer mechanisms for transferring funds. By way of example, Thursday, a payment initiator may instruct that her funds be transferred for bill payment by Friday. The payment system 100 may permit that type of short turnaround transaction to take place for instance by, in embodiments, allowing the consumer or other payment initiator to make use of payment mechanisms not generally available to consumers and others for rapid transfers, such as wire transfers or ACH transactions. The payment enabler may assign different service charges to different urgencies of payment.

The payment system 100 may determine what method of transfer will achieve the results requested by the payment initiator, at the lowest cost to the payment enabler or while satisfying other criteria for optimal results. Other methods of optimization may also be used, for instance by utilizing rules based intelligence. Variables included in the optimization model may include, for example, classification of the funding mechanism, payee, dollar amount (for example micro payments, macro payments and others) and other rules such as time of day, lead time, dollar amount, contractual minimums, reliability, pricing, detecting and taking advantage of intra-entity transfers and others.

Figure 2:
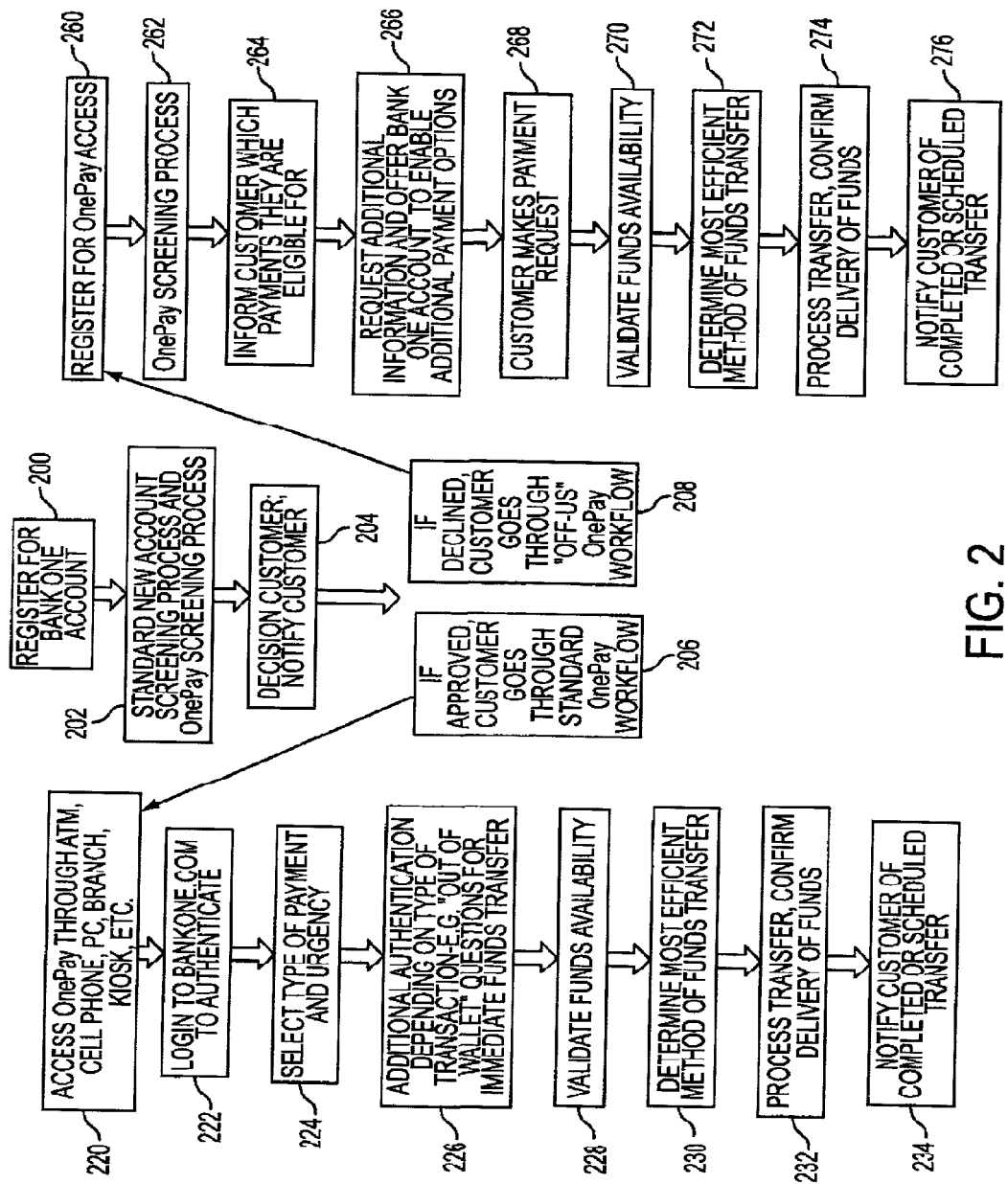
FIG. 2 is a flowchart illustrating funds processing according to one embodiment of the invention.

A flowchart of transaction processing according to an embodiment of the invention is illustrated in FIG. 2. The process starts in step 200. In step 200, processing of new customers (not preexisting) begins, at which point the customer, such as a consumer, a qualified business or other payment initiator may register for a new account enabled for payment system 100. Registration may be by in-person registration at a branch or other facility, Web site, telephone, any of the other network techniques illustrated in FIG. 1, or otherwise. In step 202, the customer may undergo a standard screening process, with possible further screening for the integrated payment services of the invention. The customer may sign up for one or more services, such as credit card, DDA, mutual fund, home equity, or others.

After identification, addressing and other information is gathered, at step 204 the host bank or other entity may decide which transfer mechanisms to allow to the customer depending on the customer's request, the risk the entity perceives and what the entity assesses the customer actually needs. If approval is received at step 206, the customer may be directed to an existing customer flow, such as that described below. If approval is declined at step 208, then the customer may be provided with a reduced or modified set of automated features at step 260. In step 220, an existing customer of a financial institution or other host entity who desires access to payment system 100 may likewise be set up to enjoy an integrated method of accessing payment vehicles instead of having to deal with a differing pipelines of instruments. Using a client 105, the customer may authorize themselves at step 222 to a Web page, VRU, bank teller, CSR or other channel. The customer may then select the type of payment and the urgency, date, cost, rewards allocations or other factors at step 224. For example, a customer may want to pay a corporate credit card bill from a travel bank account. The payment initiator may direct and authorize the payment and choose to have the bill paid the day before the date it is due.

The payment initiator may permit the payment system 100 to optimize the routing and timing of that payment. If the payment initiator chooses to key the payment to a date function to avoid late fees, the payment system 100 may select the best method that will assure that funds are presented on time at the least cost, while also deferring the payment until, for example, 3 days before hand to increase the float or interest on money in a source checking account.

On the other hand, if a payment initiator prefers to program the payment system to pay bills on the day they are received to ensure they are satisfied with time to spare, the payment system 100 may generate instructions for prompt payment at the lowest transaction fee available, benefiting the payment enabler, payment initiator or both.

As a further example, if a payment initiator has procrastinated and is near to a payment due date, they may authorize an immediate and higher cost payment to ensure payment is received by any due date, such as a mortgage or credit card due date. Depending on the my selection of payment type and urgency, in step 226 the payment system 100 may determine whether additional authorization is needed to complete the scheduled transaction. Factors taken into account for approval may include the length of time that a payment initiator has been with the bank or other host entity, the number of accounts or assets maintained by the payment initiator, risk factors such as credit history or NSF history, or others.

At this point, the bank or other host entity as payment enabler may also determine whether the transaction is possible. For instance, a payment initiator may desire to send a payment for a child's college tuition. The payment initiator may want to draw $3000 from a checking account, $4000 from a home equity account, and sell $3000 from a stock brokerage account to satisfy a $10,000 school payment due. However, if the payment initiator eagerly pursues bonus point or other benefits, they may want to use a participating credit card so the points can be used to fly the college student home over a holiday.

At step 226, the payment system 100 may permit the payment initiator to register these variables in a stored profile or otherwise to optimize the tuition payment according to date, amount, float, bonus points or other rewards or parameters. The bank or other host entity may determine if the payment initiator has sufficient available funds at step 228, and may suggest different solutions to the payments based on the payment initiator's profile. Once approved, the payment system 100 may determine the most efficient manner for payment in step 230.

In step 232, the request for transaction approval may be transparently processed by the payment system 100. While the processing may be transparent to the payment initiator, the payment system 100 may provide a GUI tracking display 136 for customer service representative (CSR) of the bank or other host entity. If there is a question on how the item was processed, the CSR can pull up the transaction and see details in an integrated view. At step 234, the payment system 100 may notify the payment initiator of a completed or scheduled transfer via a Web page message, e-mail notification, on a statement mailed to the payment initiator or other channel.

In the case of a payment initiator seeking a payment transaction who may not be a preexisting customer of the bank or other host entity, in step 260 a person having a separately branded credit card account may wish to pay a bill on that account using a check drawn on a third party bank. The payment initiator may register for access to the payment system 100 with those or other accounts. In step 262, the host entity may authenticate the offered accounts to verify that the accounts actually exist. If they do and the customer is eligible to be set up, the host entity may inform the payment initiator which payment options he or she is eligible so as to fulfill their desired transaction.

For instance, the host entity may not allow a non-customer to execute a wire transaction because once the funds are transferred, there is no way to reverse the transaction. At step 266, the host entity may therefore request authentication information to set up the process, as well as optionally offer the customer accounts with the host entity to increase payment capabilities. If the payment initiator elects to open an account with the host entity, processing may proceed to step 206.

Assuming that the payment initiator wants to access the payment system 100 with their existing accounts, the available options may be made to depend on the level of risk the host entity perceives. At step 268, the payment initiator may for instance request a transfer of money from their checking account to pay their credit account. The host entity may validate the funds availability at step 270. At step 272, the payment system 100 may determine the most efficient manner to transfer the funds, but selecting among the reduced set of available payment vehicles. At step 274, the funds may be moved into an intermediary account, or pass directly through to the payee. At step 276, the payment initiator may be notified of the completed payment or scheduled payment via a Web page message, e-mail, monthly statement, page, or other channel.

Figure 3:
FIG. 3 illustrates a user interface to schedule and manage payment transactions according to one embodiment of the invention.

An illustrative interface for use by a consumer, business or other payment initiator is shown in FIG. 3, in which a GUI 302 is displayed. GUI 302 may include a pay-from selector box 304 to identify accounts from which to pay bills, a payee selector box 306 to identity the recipient of the payment, a schedule selector box 308 to enter or select desired dates, date ranges or date offsets by which to effectuate payments, and an optimization selector box 310 with which to select one or more variables by which the transaction will be optimized including cost, schedule, rewards and other criteria. Other functions, such as account registration and other functions, may be provided.

Figure 4:
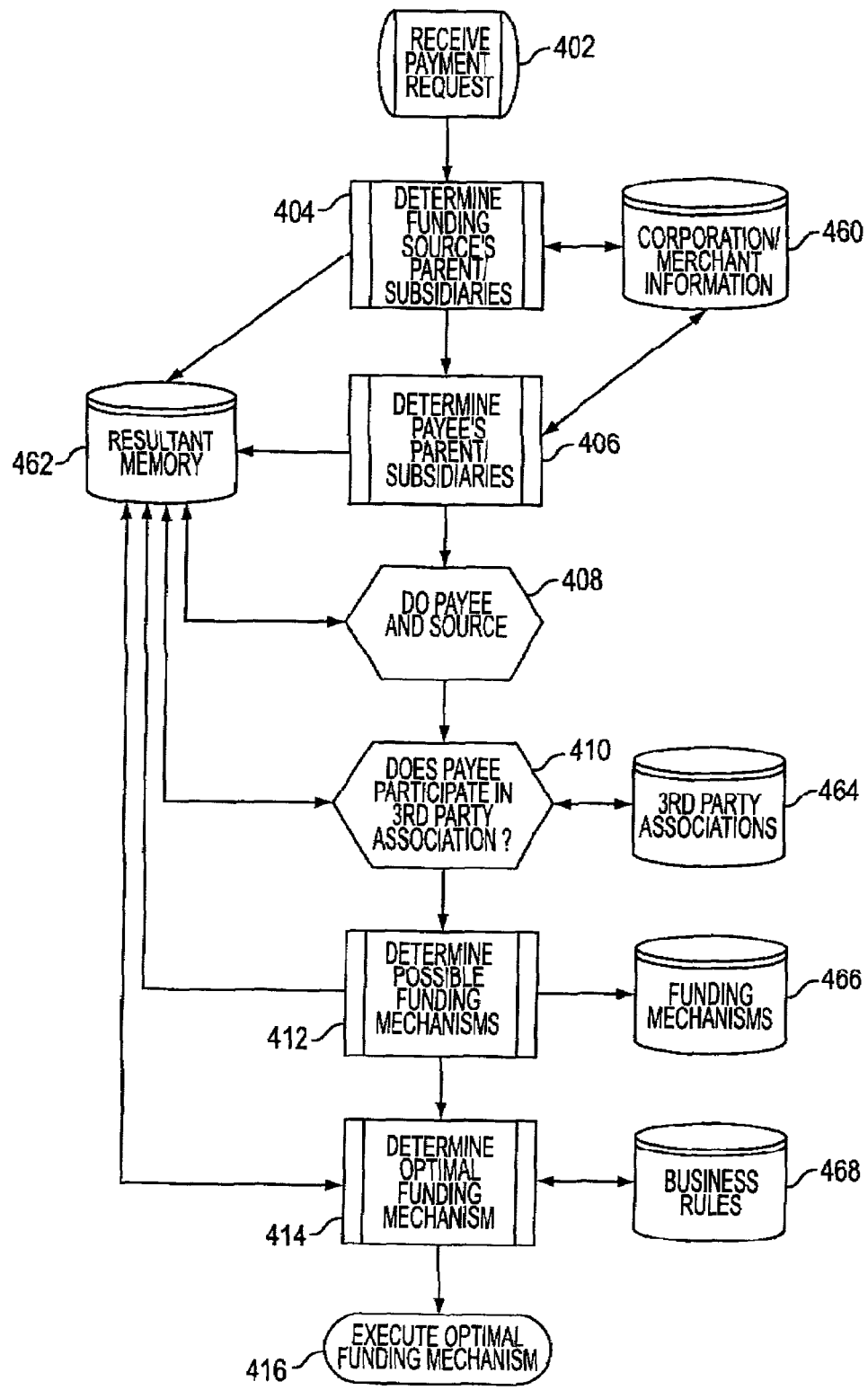
FIG. 4 illustrates optimization processing according to one embodiment of the invention.

An optimization process which may be employed according to an embodiment of the invention is illustrated in FIG. 4. In step 402, a payment request is received. In step 404, a test of the funding source's affiliations may be made, for instance by running a query against a corporate database 460. The corporate database 460 may contain information describing various corporate/merchant hierarchies and interrelationships, for instance indicating that FirstUSA Bank NA is a wholly owned subsidiary of Bank One Corp. Other affiliations are possible.

In step 406, a test may be made of affiliations of the payee of the transaction, for instance by consulting corporate database 460 or other resources. In either of step 404 and 406, information regarding the detected affiliations may be stored to memory 462, such as a relational database, data cache or other resource. In step 408, a test may be made whether the payment source and payee indicate a common affiliation, such as a parent/subsidiary or other relationship.

In step 410, a test may be made whether the payee participates in a third party association that may have an effect on the transaction. This may be done by running a query against an association database 464 or other resource, for instance storing all participants in an electronic transaction network such as Spectrum™, ACH or others. In step 412, a set of possible funding mechanisms to fulfill the transaction may be generated, for instance indicated all transfer types that will fulfill minimal scheduling requirements. This may be done by running a query on funding mechanism database 466, which may include descriptive fields such as cost, eligibility criteria, time frame, risk level, security, reliability rating and others.

In step 414 an optimal funding mechanism under all the parameters of the transaction may be generated. In so doing, a business rules database 468 may be consulted, to determine whether factors such as contractual minimums, volume discounts, micro payments or other special funds processing, tiered thresholds or other rules or intelligence may be stored. The business rules may be modified over time to reflect updated market conditions or refinements to the processing model. In step 416, the optimal transaction may be executed. In various other of the steps, data may be stored to memory 462 as appropriate.

Figure 5:
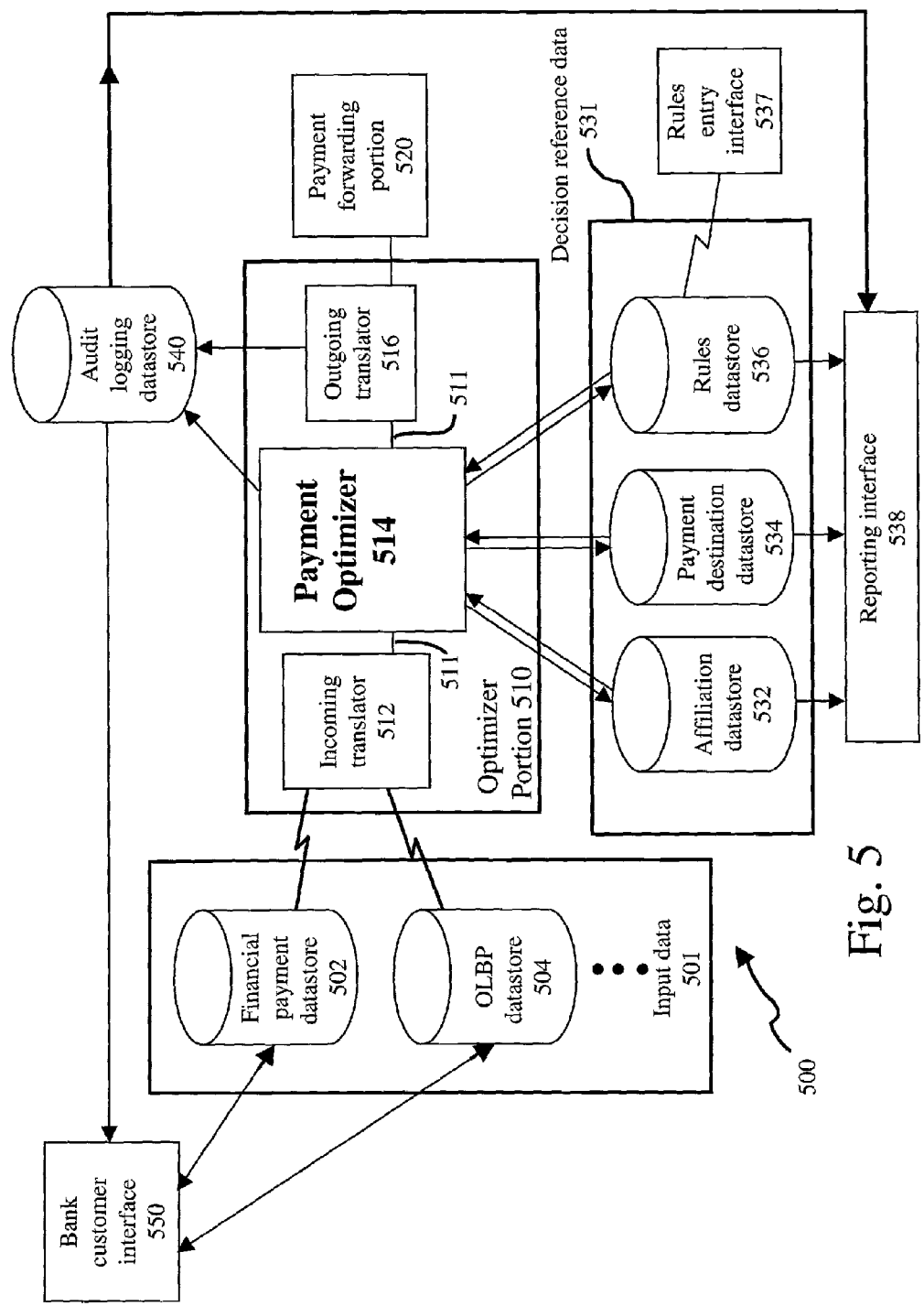
FIG. 5 is a block diagram showing a payment system including an optimizer in accordance with one embodiment of the invention.

Hereinafter, further aspects of the systems and methods of the invention will be described with reference to FIGS. 5-8. FIG. 5 is a block diagram showing a payment system 500 in accordance with a further embodiment of the invention.

The payment system 500 includes an optimizer portion 510. The optimizer portion 510 includes an payment optimizer 514. The optimizer portion 510 further includes a incoming translator 512 and an outgoing translator 516. The incoming translator 512, payment optimizer 514 and the outgoing translator 516 are in communication with each other using a suitable interface 511.

The optimizer portion 510 utilizes and is in communication with a variety of datastores. Specifically, the incoming translator 512 is in communication with the financial payment datastore 502 and the online bill pay datastore 504. The financial payment datastore 502 and the online bill pay datastore 504 might collectively be characterized as "input data" 501, as shown in FIG. 5.

To explain in further detail, the payment optimizer 514 operates as an intelligent router that utilizes the information of the requested transaction to determine the most effective and efficient means for settling a transaction under a set of rules and using various inputs. The processing performed by the optimizer portion 510, as shown in FIG. 5, begins with the incoming translator 512. The purpose of the incoming translator 512 is to input unique types of transactions from a variety of different data sources and convert them into a standardized dataset for processing by the payment optimizer 514. As shown in FIG. 5, there are two data sources shown. As described further below, these data sources include a financial payment datastore 502 and an online bill pay (OLBP) datastore 504. These two data sources may store transaction information in a different format. The translator standardizes this data utilizing suitable converters, for example.

That is, the capability provided by the incoming and the outgoing translator is to allow the input of many different formats and translate these formats into the single format or the single record format that the payment optimizer itself speaks; and thereafter output the data in a suitable format. Once the payment optimizer obtains the translated information through the incoming translator, then the payment optimizer can interrogate who is the destination, what is the timing necessary for the particular situation, what is the dollar amount, and who is the person, etc., for example. Once the payment optimizer determines what is the most efficient way to settle the transaction, then the payment optimizer actually turns and translates the data into that format. That is, the outgoing translator translates the data into the language of the particular system or mechanism that will complete or settle the transaction. The incoming translator 512 and the outgoing translator 516 might be in the form of a suitable module, for example.

As described above in accordance with one embodiment of the invention, data is translated by the incoming translator 512, processed by the payment optimizer 514, and thereafter translated by the outgoing translator 516. It should be appreciated that various reconciliation may be performed in this process. That is, it may be desirable to reconcile the data that is output by the outgoing translator 516 with data that is input by the incoming translator 512. This reconciliation might identify problems or errors in the processing performed by the optimizer portion 510. Any other data that is processed by the optimizer portion 510 may also be reconciled, as is desired.

It should further be appreciated that there may be a variety of communications, including various reporting, between the payment optimizer 514 and the financial payment datastore 502, the online bill pay datastore 504 or some other input data source. For example, data may be input from the financial payment datastore 502, translated by the incoming translator 512 and then, during processing by the payment optimizer 514, the payment optimizer 514 may determine that further data is needed from the financial payment datastore 502. Accordingly, the optimizer portion 510 may then contact the financial payment datastore 502 so as to obtain the needed information.

It should be appreciated that the number of data sources is not limited. Further, for a new datastore, such as the datastores (502, 504) it may be that an existing converter, in the incoming translator 512, may be used, or alternatively, it may be that the new datastore requires a new converter to be developed and implemented. The systems and methods of the invention allow rapid incorporation for expansion to new incoming data sources, whether or not new converters are needed.

Once the transaction information is input from one of the datastores (502, 504) and processed by the incoming translator 512, the converted data is then input into the payment optimizer 514.

The payment optimizer 514 is a rules based decision engine. The payment optimizer 514 takes input from multiple sources. The payment optimizer 514 uses this input to make a decision as to the correct payment method to use, i.e., in order to optimize the transaction based on the available information. The payment optimizer 514 obtains information from five key data sources, in accordance with one embodiment of the invention. As described above, two sources represent inputs to the system, i.e., the financial payment datastore 502 and the online bill pay datastore 504. Further, the other three sources represent decision reference data for the payment optimizer 514. These other three sources include the affiliation datastore 532, the payment destination datastore 534, and the rules datastore 536. The affiliation datastore 532, the payment destination datastore 534 and the rules datastore 536 might collectively be characterized as "decision reference data" 531, as shown in FIG. 5. These additional datastores (532, 534, 536) are described further below.

The payment optimizer 514 utilizes a logic in performing the processing of transactions. The logic is designed into the payment optimizer 514 to result in a specific payment method selection. This selection is based on the rules at the time of the decision. Any of a variety of rules may be used, such as those described above. The payment optimizer 514 then initiates the payment via the proper payment method, i.e., as determined by the rules of the payment optimizer 514.

In accordance with one embodiment of the invention, the processing performed by the payment optimizer 514 may occur as a batch process operating on a standard periodic basis. However, the systems and methods of the invention are not limited to batch processing. For example, some types of transactions may be identified and processed immediately and independently of other requested transactions.

The processing performed by the payment optimizer 514, and the data involved in that processing, may be captured in any suitable manner. As shown in FIG. 5, the payment system 500 includes an audit logging datastore 540. In accordance with one embodiment of the invention, all decisions made by the payment optimizer 514 and all outgoing transaction information generated by the payment optimizer 514 are sent to the audit logging datastore 540. This information is captured both for audit purposes and for reporting purposes. Further, the payment system 500 may also be capable of handling errors that are encountered during processing. Accordingly, the information regarding any errors encountered during the optimization process, performed by the payment optimizer 514, are sent to a suitable error logging datastore and for further processing, as described further below.

As described above, in accordance with one embodiment of the invention, all decisions made by the payment optimizer 514 and all outgoing transaction information generated by the payment optimizer 514 are sent to the audit logging datastore 540. This information is captured both for audit purposes and for reporting purposes. Further, any of a wide variety of data reporting procedures or processes may be used in the various embodiments of the invention. That is, for example, any of data that is input, output, or processed by any of the incoming translator 512, the payment optimizer 514, or the outgoing translator 516 may be reported, compared, or reconciled, as is desired.

The optimizer portion 510 includes an outgoing translator 516, as described above. The outgoing translator 516 processes information output from the payment optimizer 514. That is, the purpose of the outgoing translator 516 is to take a standard dataset, processed by the payment optimizer 514, and translate such data into any of a variety of formats, i.e., to be used in a particular payment method. For example, the data and format required for an "internal transfer" may well be different than the data and format required to send to an outside processor, such as Checkfree or Spectrum, i.e., an "external transfer." Once the outgoing translator 516 prepares the data for a particular payment method, the data is then sent to the payment forwarding portion 520. The payment forwarding portion 520 forwards the data to the desired destination so as to effect the desired payment method.

In accordance with further aspects of the invention, the payment optimizer may provide optimization of transactions based on any of a variety of criteria. For example, the optimization may be based on a benefit to the customer initiating the transaction, and/or a benefit to the corporation/bank that is handling the transaction and maintaining the payment optimizer. For example, the optimization might benefit a customer by choosing a credit card account that provides the customer 30 days before accruing interest, i.e., for the benefit of the cardholder. Further, the payment optimizer might choose a credit card of the customer that has the lowest interest rate. For example, the payment optimizer 514 might look at each credit card of a customer on a routine basis to determine the lowest APR or some other criteria that is favorable to the customer. A wide variety of rules may be used by the payment optimizer 514, such as, for example, that a person's credit card limit cannot be exceeded.

Alternatively, the optimizer might process the transactions in such a way so as to benefit the corporation. For example, in order to fulfill a quota, the corporation might elect to process a transaction using a particular processing entity, which is in fact slightly more expensive to the customer, but that will be a savings to the corporation. Further, the optimizer portion might save the corporation money by simply saving money on each transaction. As should be appreciated, a 2 or 3 cent savings can translate into millions of dollars over the course of time.

It should be appreciated that processing as described herein, in accordance with one aspect of the invention, is performed to the financial benefit of a corporation maintaining the payment optimizer. However, it is to be understood that these benefits to the corporation can be passed on as benefits to the customer, for example, of the corporation. For example, savings experienced by the corporation can result in reduced fees for the customer.

The payment optimizer may choose between different methods of settling a transaction by attempting to benefit both the corporation and the customer. This might be done in some weighted manner. For example, one settlement mechanism might benefit the corporation 2 cents whereas another settlement mechanism might benefit the customer 7 cents. The payment optimizer might then opt to benefit the customer the 7 cents—and might recoup its 2 cent loss in some manner, i.e., such as 2 cent fee to the customer.

In accordance with a further aspect of the invention, the payment optimizer 514 might use a scoring mechanism to optimize a transaction for the benefit of the corporation, i.e., the corporation that maintains the payment optimizer system. To explain, a risk model using a scoring system might be utilized by the payment optimizer 514.

In accordance with one embodiment of the invention, the scoring mechanism allows a bank or other entity to score people based on their age with the bank (the longer results in a better score), the type of account, any past problems with the person or other past history, average daily balance, as well as other criteria. Based on those scores, the various customers drop into different tiers or categories. The tiers allow the bank to determine on any given day how much credit might be given to the customer. For example, there will be some settlement mechanisms that require a good funds technique, which means that the bank needs to take the risk for a certain period of time until that payment clears. Accordingly, a bank using the payment optimizer may keep track of how much risk the bank is willing to take on the individual person, on a given day, to see if that person is eligible for a certain payment mechanism. For example, the payment optimizer 514 may allow the bank to use the payment mechanism that is most cost effective—choosing from those payment mechanisms that the person is eligible on that given day.

Further, a daily limit and a weekly limit might also be utilized to determine which payment mechanism should optimally be used. Further, it should be appreciated that blanket overrides or other mechanisms might be used, i.e., based on current situations on a given day. Further, the scores accorded to persons and the elements that make up those scores may be revised every day or in some other routine fashion, for example As described above, the incoming translator 512 may receive transaction information, i.e., information regarding a transaction, from any of a variety of datastores. The financial payment datastore 502 is the database behind a user application. That is, the financial payment datastore 502 interfaces with a user to collect the various preferences of the user. As should be appreciated, this interface between the financial payment datastore 502 and the user may be manifested in any number of ways. Accordingly, the financial payment datastore 502 allows an individual to specify various parameters associated with a payment or a number of payments. The individual then invokes the payment to take place based on these parameters stored in the financial payment datastore 502.

Another database that provides the optimizer portion 510 with information regarding a transaction is the online bill pay datastore 504. The online bill pay datastore 504 is an existing warehouse application for an On-line Bill Pay application. The online bill pay datastore 504 stores information associated with all of the On-line Bill Pay transactions.

Figure 6:
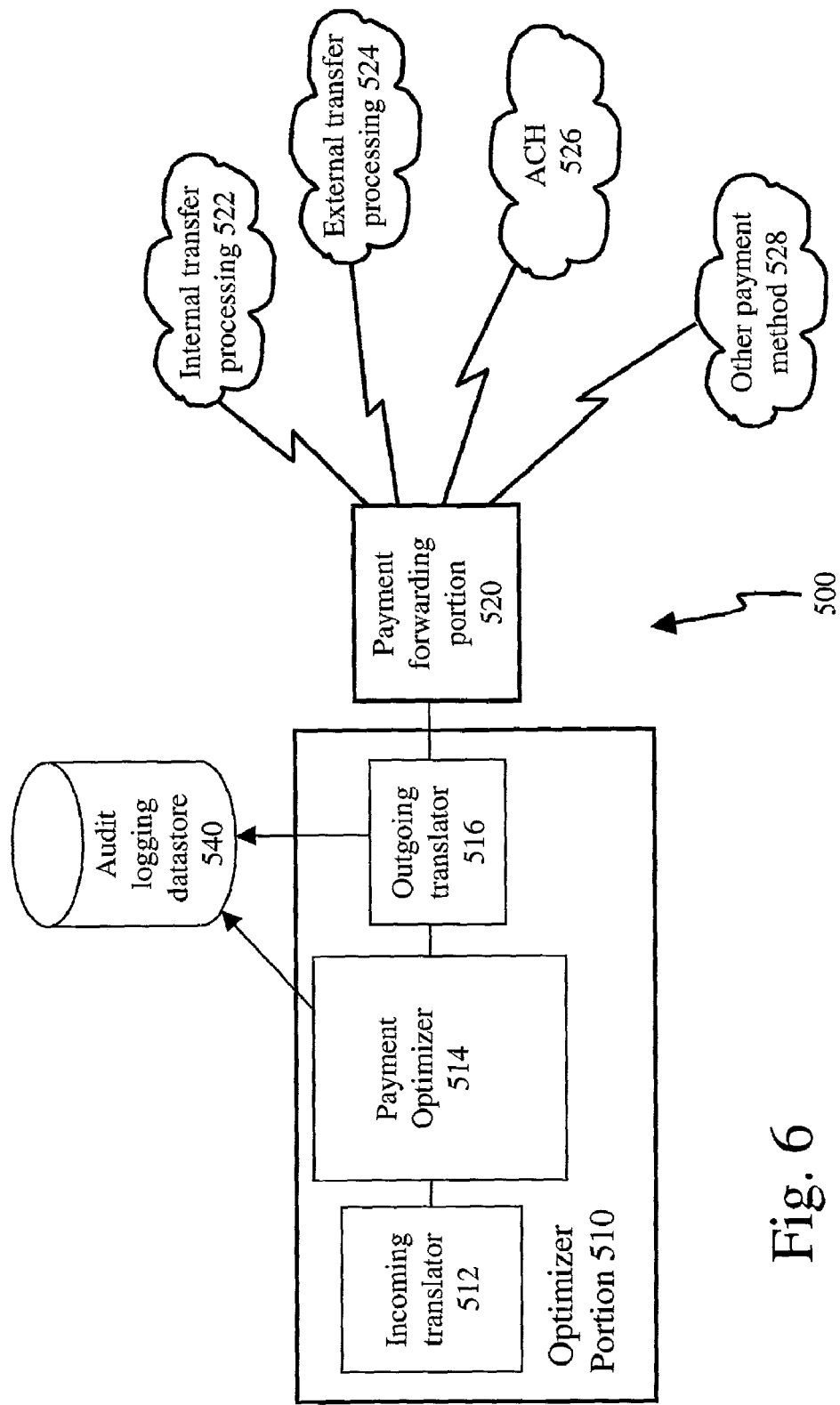
FIG. 6 is a block diagram showing further details of the optimizer of FIG. 5 relating to payment methods in accordance with one embodiment of the invention.

FIG. 6 is a block diagram showing further aspects of the payment optimizer 514 and possible payment methods. As described above, once the outgoing translator 516 prepares the data for a particular payment method, the data is then sent to the payment forwarding portion 520. The payment forwarding portion 520 forwards the data to the desired destination so as to effect the desired payment method. As shown in FIG. 6, the payment forwarding portion 520, as instructed by the payment optimizer 514, forwards data regarding a transaction to any of a wide variety of payment methods, such as those described above.

For example, the payment optimizer 514 may have determined that the requested payment involves an internal transfer. As a result, the payment forwarding portion 520 forwards the transaction data for internal transfer processing 522 using one of the methods described above or another method. Alternatively, the payment optimizer 514 may have determined that the requested payment involves a transaction between an internal account, i.e., an account maintained by the same entity that maintains the payment optimizer 514, and an external account. As a result, the payment optimizer 514 instructs the payment forwarding portion 520 to forward the transaction data, subsequent to processing by the outgoing translator 516, to the external transfer processing 524. As shown in FIG. 6, the payment information might alternatively be forwarded for ACH processing 526. Any of a variety of other payment methods 528 may also be used by the payment optimizer 514, as shown in FIG. 6.

In further illustration of the systems and method of the invention, a payment using a conventional process may be contrasted with a payment using the payment optimizer. That is, for example, a payment may be due to a fictitious entity such as "SataliteTVCompany," whose account is with Bank One. Also, the payer, i.e., a SataliteTVCompany subscriber, may have a Bank One account. Using conventional processes, the account-holder-subscriber's SataliteTVCompany payment goes through a long process to settle with their Bank One account. That is, the payment to SataliteTVCompany might be initiated by the account-holder-subscriber using Checkfree. The payment is sent to Checkfree and the account-holder-subscriber's Bank One account is debited. Then, Checkfree sends the payment to SataliteTVCompany via mail or electronic file, and charges for the service. The payment is then received and processed at a Bank One lockbox. Finally, the loop is closed when the Bank one account for SataliteTVCompany is credited However, the above illustrative process is substantially simplified by the systems and methods of the invention. That is, using the process of the invention, the SataliteTVCompany payment is processed by the payment optimizer. That is, the account-holder-subscriber initiates the payment to "SataliteTVCompany." The payment information is then set to the optimizer portion 510. The optimizer portion 510 recognizes SataliteTVCompany as a lockbox merchant. Accordingly, the optimizer portion 510 knows to route the payment to the Bank One lockbox of SataliteTVCompany electronically. Thus, an internal transfer of funds occurs from the account-holder-subscriber's account to the SataliteTVCompany account at Bank One. As a consequence, Checkfree costs are eliminated as well as the paper processing costs for the Bank One lockbox of SataliteTVCompany.

Hereinafter further aspect of the invention will be described with reference to FIG. 5. As described above, the payment optimizer 514 obtains information from various data sources, in accordance with one embodiment of the invention. Two sources represent inputs to the system, i.e., the financial payment datastore 502 and the online bill pay datastore 504. The other three sources represent decision reference data for the payment optimizer 514. These other three sources include the affiliation datastore 532, the payment destination datastore 534, and the rules datastore 536.

The affiliation datastore 532, as shown in FIG. 5, is the primary component in determination of whether a payment will go to an externally associated account via a specific payment association, such as Spectrum, for example. The affiliation datastore 532 carries information as to whether the account being paid is associated with a specific payment association and then incorporates information from the rules database containing cost information to determine the appropriate method for payment. The information contained in the affiliation datastore 532 is only valuable for as long as it is accurate. To ensure accuracy, this datastore will routinely obtain updates from suitable systems of record for each of the payment destinations.

Figure 7:
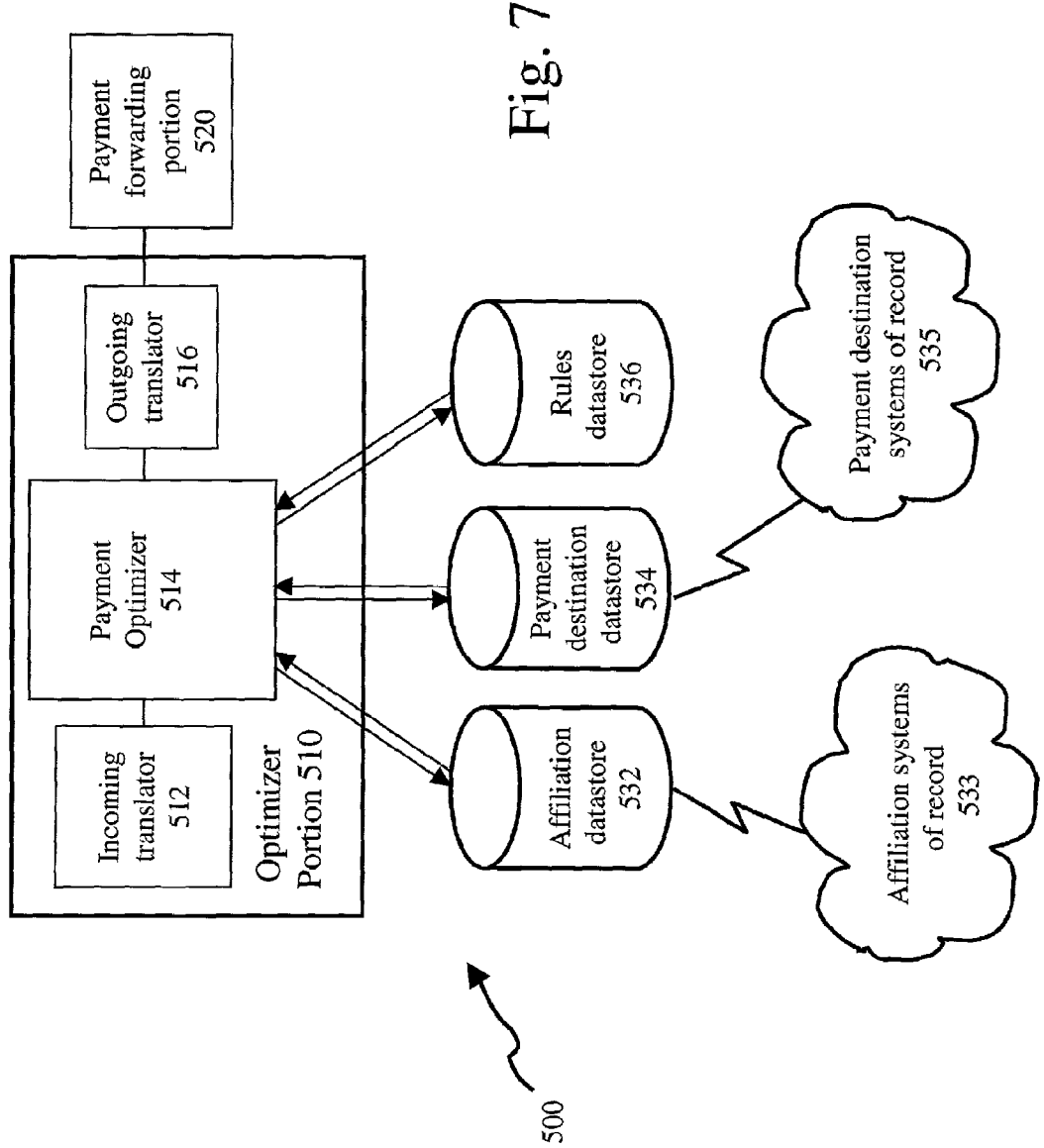
FIG. 7 is a block diagram showing further details of the optimizer of FIG. 5 in accordance with one embodiment of the invention.

That is, FIG. 7 illustrates further aspects of the system and method of the invention including the affiliation systems of record 533. The affiliation systems of record 533 interfaces with the affiliation datastore 532 to provide the affiliation datastore 532 with information. That is, the affiliation systems of record 533 are the source by which the affiliation datastore 532 ensures that its records are accurate. The affiliation datastore 532 routinely obtains updates from the various systems of record 533 to ensure that payments are not incorrectly optimized. The updates from the affiliation systems of record 533 may be obtained on a periodic basis or may be obtained as a result of some event occurring. The affiliation systems of record 533 may contain or be in communication with any of a variety of entities. Such entities or affiliations might include RPPS, CheckFree, EZPay, Internal Transfers, Commercial Lockboxes or any other entity or settlement/payment mechanism, for example.

The payment system 500 also includes the payment destination datastore 534, as shown in FIG. 7. The payment destination datastore 534 is the primary component in determination, by the payment optimizer 514, of whether a payment goes to an internally associated account, an externally associated account, or if it requires usage of an OLBP payment method, which may be an outside check vendor, for example. The payment destination datastore 534 carries information, in accordance with one embodiment of the invention, as to whether the account being paid is an (a) internally associated account, i.e. a Bank One car loan, or First USA credit card account, for example; (b) internally associated account via a secondary relationship, i.e. Bank One is the bank account for StatePowerCompany, for example; (c) externally associated payment via a third party association, i.e. both financial institutions belong to the same automated clearing house; and/or (d) externally associated account with no ties to Bank One, for example.

Based on the information obtained by the affiliation datastore 532 and the payment destination datastore 534, as well as the rules that are in place, the payment optimizer 514 makes the choice of how the payment should be handled. It should be appreciated that the information contained in the payment destination datastore 534 is only valuable for as long as the information is accurate. Accordingly, to ensure accuracy, the payment destination datastore 534 routinely obtains updates from payment destination systems of record, i.e., for each of the payment destinations.

That is, as shown in FIG. 7, the payment destination datastore 534 obtains updates from the payment destination systems of record 535. The payment destination systems of record 535, as shown in FIG. 7, are the set of systems which constitute the universe of payment destinations. This list will be finite only in that there is a limited set of accounts to which payments can be sent (i.e. accounts which belong to financial institutions). Further, it is noted that the payment optimizer 514 might be interfaced with a system that can be utilized for person-to-person payments. As a result, the number of destination accounts could be substantially increased.

As shown in FIG. 5, the payment system 500 also includes a rules datastore 536. The rules datastore 536 contains specific decision information not related to any specific payment, but to the optimization of all payments.

The information in the rules datastore 536 might include a cost per transaction for each payment method or information regarding contractual obligations, for example, or other rules or parameters as are described above.

To explain further, a particular bank may have entered into a contractual agreement with a particular processing entity, such as CheckFree, for example. The processing entity provides a particular payment mechanism. The arrangement might include volume discounts, but only if a certain number of transactions is processed for the particular bank by the processing entity and/or if the processing entity generates a certain revenue, for example. Accordingly, the optimizer portion 510, using the rules datastore 536, will optimize the various transactions so as to satisfy the number of transactions needed for the volume discount, if such is desired. Illustratively, it may be the situation that transactions, which would not otherwise be forwarded to a processing entity, might indeed be forwarded to the particular processing entity, i.e., so as to satisfy the requirements for the volume discount, for example.

Further, if a certain number of transactions are processed by a processing entity, such that the threshold is attained for a volume discount, the payment optimizer might then switch to a second processing entity. For example, the optimizer might progress through each processing entity so as to satisfy each processing entity's quota in turn.

Additionally, it might be the situation that a particular payment mechanism is simply exhausted. That is, an allowed amount of transactions have been processed using the particular payment mechanism. In this case, the payment optimizer would of course have to move on to a further payment mechanism.

The rules datastore 536 is maintained so as to routinely be provided with updated and current information. In accordance with one embodiment of the invention, the rules datastore 536 is updated using a rules entry interface 537, as shown in FIG. 5. The rules entry interface 537 allows for real-time updating of the rules datastore 536 for incorporation into the payment optimizer 514.

The rules entry interface 537 may be in the form of any of a variety of user interfaces. The rules entry interface 537 allows a user to access and change information in the rules datastore 536. Accordingly, the rules entry interface 537 is a simple user interface used to update the rules contained within the rules datastore 537.

It should be appreciated that the user of the rules entry interface 537 might be, for example, an account holder at a bank and/or a system administrator at the bank. However, each of such users possess limited access to the various rules in the rules datastore 536. That is, the system administrator might have access to a first set of rules. Further, the account holder might have access to a second set of rules.

The rules datastore 536 may use any of a variety of rules and techniques, as are described above, for example. Illustratively, the rules datastore 536 may contain rules that are effected by changing parameters. That is, a rule might dictate that a particular payment is debited from one of the payment initiator's credit cards, each of which possesses a particular annual percentage rate (APR). The rule may dictate that the card with the lowest current APR be debited. Since the APR of the credit cards may vary, i.e., one card might be lowest at one point in time but then be the highest at another point in time, the card to be debited will also vary.

As shown in FIG. 5, the payment system 500 also includes an audit logging datastore 540. The audit logging datastore 540 is the primary datastore in the payment system 500 that provides for both auditing and reporting on the processing performed by the optimizer 514. Further, the audit logging datastore 540 provides feedback to a bank customer interface 550, as shown in FIG. 5.

The audit logging datastore 540 receives information directly from the payment optimizer 514 for every transaction that the payment optimizer 514 handles. The audit logging datastore 540 also receives information from the outgoing translator 516. The information from the outgoing translator 516 contains data regarding how each transaction was sent for payment. The audit logging datastore also serves as the source for requests from the Bank customer service interface 550 and the reporting interface 538, each of which are described below.

As shown in FIG. 5, the payment system 500 also includes a reporting interface 538. In accordance with one embodiment of the invention, the reporting interface 538 is a non-data storing application which utilizes the multiple datastores within the optimizer application to provide reporting to a user. That is, the reporting interface 538 allows a user to access information in any of the datastores including the affiliation datastore 532, the payment destination datastore 534, the rules datastore 536, and/or the audit logging datastore 540. The information provided by the reporting interface 538 may be in any of a variety of forms. For example, the information provided by the reporting interface 538 might be set up as a predefined reports, or alternatively, as ad-hoc reporting, i.e., depending on the nature of the information requested by the user and design requirements, for example.

Any of a variety of user interfaces might be used to control and monitor the processing performed by the payment system 500. In accordance with one embodiment of the invention, the bank customer interface 550 might provide an interface for a customer and/or other persons. Further, the reporting interface 538 might provide an interface for the corporation, such as a bank, for example. Accordingly, the reporting interface 538 might allow a bank administrator, a financial manager or any other person to control and/or monitor operations in the payment system 500.

As described above, the payment system 500 includes the bank customer interface 550. The bank customer interface 550 provides a window into the processing performed by the optimizer portion 510. That is, a bank customer service representative, for example, requires the ability to do research associated with any particular payment that is made by the payment optimizer 514. Accordingly, the bank customer interface 550 allows a service representative to see the transaction history for each transaction that was processed by the payment optimizer 514 and provide appropriate information to the customer, i.e., an account holder, for example. This information might be provided through a phone representative who has access to the bank customer interface 550, for example. However, information might also be provided to a customer using other techniques such as a self-service website that is in communication with the data in the audit logging datastore 540.

Figure 8:
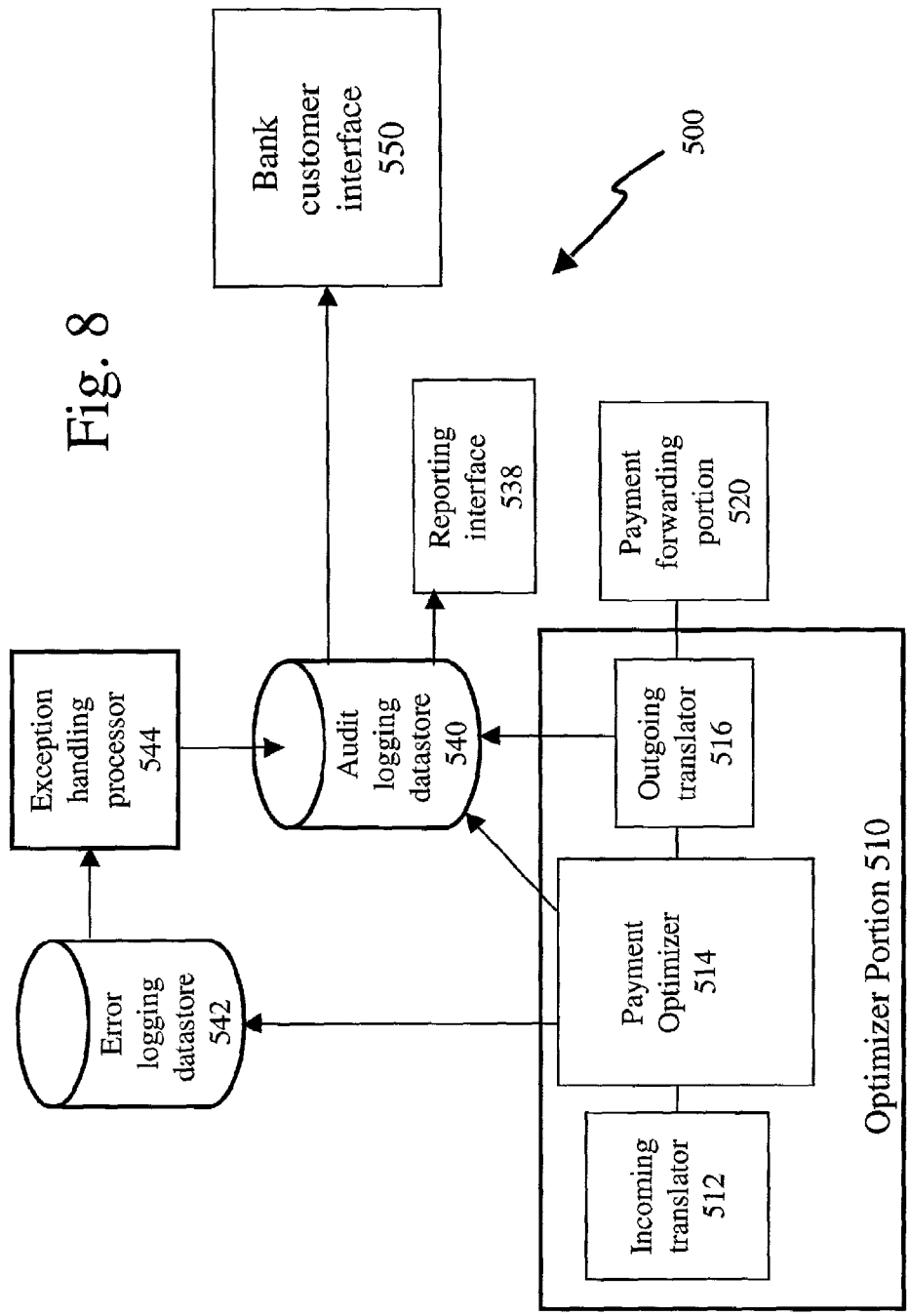
FIG. 8 is a block diagram showing further details of the optimizer of FIG. 5 relating to possible errors and exception handling in accordance with one embodiment of the invention.

As described above, information regarding a transaction is input to the incoming translator 512. The information received is then converted to information that is processed by the payment optimizer 514. The payment optimizer 514 utilizes a variety of information obtained from various datastores in determining the preferred manner in which to process an input transaction. However, as should be appreciated, there may be errors that are determined in the processing performed by the optimizer portion 510. In accordance with one embodiment of the invention, FIG. 8 is a block diagram showing an error logging datastore 542 and an exception handling processor 544. The error logging datastore 542 and the exception handling processor 544 are components that work in conjunction with the payment optimizer 514 and the audit logging datastore 540 in handing errors encountered in processing performed by the optimizer portion 510.

That is, the error logging datastore 542 receives information regarding any and all errors encountered by the payment optimizer 514 as part of the optimization process. The error logging datastore 542 logs each of the errors and information regarding the errors. This information logged by the error logging datastore 542 might include the date, time, nature of the requested transaction, processing that was performed on the requested transaction, and specifics of why the processing encountered an error. After logging of the error situation in the error logging datastore 542, the information regarding the error situation is then output to the exception handling processor 544. The exception handling processor 544 then reviews, i.e., processes the information, to ensure that no requested transactions are missed. For example, the exception handling processor 544 might provide the ability for manual intervention by a bank worker, for example. Such manual intervention might be necessary with the processing of some transactions. Further, the exception handling processor 544 might employ other systems or means of processing a particular transaction. These other systems might be more expensive, but justifiable, in order to process the particular transaction.

To explain further, the exception handling processor 544 reviews transactions on which errors occurred and takes appropriate actions based on the rules defined for handling each exception type. The rules may be stored in the rules datastore 536, as shown in FIG. 5, or some other suitable datastore. The results from exception handling are then sent to the audit logging datastore 540 to ensure completeness of transaction history.

It should be appreciated that errors encountered by the payment optimizer 514 and handled by the exception handling processor 544 may be resolved in any of a variety of manners. For example, a wait time might be employed in some circumstances in anticipation that the circumstances that caused the error might resolve themselves. Alternatively, a default payment might be utilized if other payment methods encounter problems. Further, it might be that the exception handling processor 544 employs manual intervention in some situations, such as interfacing with a person at the bank who monitors operations of the payment optimizer 514.

As described above, a variety of data is exchanged between the various components in the payment system 500. This data is converted for the payment optimizer 514 using the incoming translator 512 and then, after processing by the payment optimizer 514, the processed data is converted by the outgoing translator 516. Any of a variety of data types may be used in the operation of the payment system 500. Preferably, data types are used that allow maximum flexibility. For example, XML datasets might be used in the systems and methods of the invention.

In further explanation of aspects of the invention, a wide variety of batch processing may be used in accordance with the various embodiments of the invention. For example, a batch of all the bill payment data that persons put out, as well as a batch of all online bill payment application data, might be individually batched up and sent into the optimizer portion 510. Then, the optimizer interrogates or processes each batch and decides to send some transactions to CheckFree, for example, and others to some other settlement mechanism. This forwarding to the settlement mechanism might also be done in the form of batch processing.

Rather than using batch processing, the payment optimizer of the invention might use serial processing so as to process each transaction in real time. This would of course provide quicker turnaround time as compared with batch processing, which would be desirable in some situations.

Further, it should be appreciated that some aspects of the processing and communication of the optimizer portion 510 might include use of a tiered, three portion message. That is, the optimizer portion 510, either to send or receive information, might utilize an incoming payment message, a payment optimizer message and further an outgoing message. These three messages might be grouped and communicated together in the form of a tiered, three portion message that corresponds to processing performed by the incoming translator 512, the payment optimizer 514 and the outgoing translator 516, respectively. The tiered, three portion message might be communicated from the optimizer portion 510 to an auditing or reporting system or database, for example.

In accordance with an aspect of the invention, the optimizer portion 510 might interact with a third party. To explain, the optimizer portion 510 might be maintained by a first bank, i.e., a home bank to the optimizer. However, the home bank might enter into an agreement with a "different bank" such that the home bank agrees to optimize the transactions of the different bank for a fee. In this situation, the different bank can forward transactions to the home bank for processing, i.e., for processing by the optimizer portion 510. Accordingly, the home bank and the different bank can work together to leverage out the optimizer portion 510, which is maintained by the home bank. This might be justifiable by the different bank since it would save money in the optimized processing. Further, of course, the home bank would recoup some of its expense for the optimizer portion 510 and related systems, such as shown in FIG. 5. The communication between the home bank and the different bank might use batch processing, as desired The tiered, three portion message described above might be utilized in the communication between the home bank and the different bank, as desired. For example, transactions are forwarded from the different bank to the optimizer portion 510 in the home bank, and subsequently processed in serial fashion by each of the incoming translator 512, the payment optimizer 514 and the outgoing translator 516, for example. The processing performed by the optimizer portion 510 might then be forwarded to the different bank in the form of the tired, three portion message. Such communication would provide the different bank with information to perform auditing or reporting, as desired.

It should further be appreciated that various models may be used regarding the arrangement of the home bank, for example, and a third entity, i.e., such as the "different bank" described above. For example, the optimizer in the home bank might process a transaction and proceed with settling the transaction without further involving the "different bank," except to probably report to the different bank. Alternatively, the home bank might determine, through processing by the payment optimizer, which is the most efficient and cost effective way to process a particular transaction. This information might then be forwarded to the different bank, i.e., such that the different bank actually processes and completes the transaction using the information generated by the payment optimizer of the home bank. Any other arrangement might be used such that the home bank and the other bank, for example, work together to effectively settle a transaction using the benefits of the payment optimizer.

Further, the home bank itself may not maintain the payment optimizer itself in accordance with one embodiment of the invention. That is, the systems and software supporting the payment optimizer might be provided to some further entity. This further entity might be a technical entity, for example. This further entity would maintain the payment optimizer and provide optimization services to the home bank or any other entity, as desired.

While the "different bank" has been illustratively described above, it should be appreciated that any third party might play the role of the different bank described above, such as any other financial institution, for example.

The payment system 500 of the invention provides for cost avoidance in conjunction with the use of a wide variety of settlement mechanisms. The payment optimizer may, for example, provide benefits to a financial institution, a customer of a financial institution, or both, using predetermined rules and a variety of inputs.

FIG. 9 is a block diagram showing an optimizer system 700 in accordance with one embodiment of the invention. FIG. 9 and the description below describes further aspects of the invention. It should be appreciated that the optimizer system 700 may utilize any of the various features described above, such as the incoming translator, the outgoing translator and/or the audit logging datastore, for example.

FIG. 9 shows a system 700 that manages transactions in accordance with one embodiment of the invention. The optimizer system 700 includes an input portion 710, a processor 720 and an output portion 730. The input portion 710 inputs payment transaction information relating to one or more requested transactions. The processor 720 uses the payment transaction information, as well as a set of available settlement mechanisms, to generate an output. The output of the processor 720 is the selection of the most effective settlement mechanism, in accordance with one embodiment of the invention. This selection is output in the form of a record that is in a format of the chosen settlement mechanism. The output portion 730 in the optimizer system 700 outputs the output from the processor.

In accordance with one embodiment of the invention, the processor 720 contains an optimization portion 729. The processor 720 including the optimization portion 729 determines which settlement mechanisms are available for a requested transaction. Further, the processor 720 including the optimization portion 729 determines, of those settlement mechanisms that are available for a requested transaction, which one is the most effective settlement mechanism.

The processor 720 may use batch file processing or real time processing, for example. That is, the input portion 710 may input a plurality of payment transaction information that each relate to respective requested transactions. The input portion may input the plurality of payment transaction information collectively using a batch file and the processor 720 may process the plurality of payment transaction information as a batch file. Alternatively, the processor 720 may input the plurality of payment transaction information each as a real time transaction. Accordingly, the inputting of a transaction would happen as close to real time as the communications and processing would allow.

The input portion 710 may input, and the processor 720 may process, any of a wide variety of requested transactions. For example, the requested transaction might be an online bill payment transaction. Alternatively, the requested transaction might be a balance transfer or an online purchase, for example. Further, the output, which is generated by the processor 720 and output by the output portion 730, may vary widely. The output may be an internal transfer to an electronic lock box or the output may be a merchant acquirer, for example.

In accordance with one embodiment of the invention, the processor 720 may use a good funds model 722 in the processing associated with generating an output for a requested transaction. That is, a good funds model may be used that relates to the risk of using an available settlement mechanism to process the requested transaction. Based on the good funds model, the processor 720 may either accept the risk of the requested transaction for a particular settlement mechanism; or alternatively, not accept the risk of the requested transaction for a particular settlement mechanism.

In accordance with a further aspect of the invention, it should be appreciated that various other information may be used in the optimization processing performed by the processor 720. For example, a requested transaction may be associated with an account that will be debited upon processing the requested transaction. The processor 720 may include a risk scoring portion 724. The processor 720 utilizes a risk scoring algorithm or process (in the risk scoring portion 724) in conjunction with generating the output, i.e., the output being a selected settlement mechanism. The risk scoring algorithm may use at least one of age of the account, average daily balance of the account, available balance of the account, five day total of bill payments outstanding of the account, account status, and/or number of past NSF transactions, for example. As a result, the risk scoring portion 724 determines a level of risk associated with payment of the requested transaction. This level of risk is then used by the processor 720 in the optimization processing.

Further, the processor 720 may contain a datastore 726 of all available settlement mechanisms. In accordance with one embodiment of the invention, the datastore 726 of all available settlement mechanisms contains a profile for each settlement mechanism. The profile contains information relating to at least one of: time to complete settlement of a particular settlement mechanism, cost of a particular settlement mechanism, risk profile of a particular settlement mechanism, and/or contractual minimums of a particular settlement mechanism, for example.

A payment that is requested, and input by the input portion 710, may designate a payment destination. The processor 720 may contain associations between the payment destination and available settlement mechanisms that can process such a payment. In accordance with one embodiment of the invention, the processor 720 contains a matching portion 728. The matching portion 728 contains a matching algorithm. The matching algorithm matches the payment destination, which is associated with the payment request, with at least one available settlement mechanism that can process that payment. Further, the algorithm may assign various weighting to the requested transaction based on at least one of address matching, account number matching and name matching. This weighting is then used by the processor 720, as a factor, in determination of the most effective settlement mechanism.

In accordance with one embodiment of the invention, the datastore of available settlement mechanisms 726 first determines a set of available settlement mechanisms that are available. Then, that set is forwarded to the matching portion 728. The matching portion 728, using the possibilities as determined by the datastore of available settlement mechanisms 726, further narrows the available settlement mechanisms. To explain more generally, it should be appreciated that the hierarchy or order in which the various components of the optimizer are utilized may vary, as desired. That is, one component may generate a group of available settlement mechanisms, and in turn, that limited list be output to a further component for further narrowing. Accordingly, the order in which the various components of the optimizer contribute to the selection process may vary depending on the particular situation and as desired.

The processor 720 including the optimization portion 729 may use an optimization algorithm in conjunction with generating the output. For example, the optimization algorithm may utilize one of a risk score, information in available datastores, profile data; and/or destination matching, for example, to determine the most effective settlement mechanism.

It should be appreciated that the processor 720 and the output portion 730, as described above, outputs the most effective settlement mechanism. However, the method and system of the invention are not limited to this. That is, for example, the processor 720 and the output portion 730 may instead output a number of possible settlement mechanisms, which satisfy predetermined criteria, as desired. Accordingly, further processing or analysis may then be performed at some later time to determine the specific settlement mechanism that is ultimately used to settle the requested transaction.

In accordance with a further aspect of the invention, it should be appreciated that the processor 720 may use a collection of requested transactions so as to determine the settlement mechanism to be used for a particular requested transaction. To illustratively explain, a group of similar transactions may be accumulated by the processor 720, and a determination made by the processor whether a quota is satisfied by the group of transactions, i.e., by the number of transactions. If the quota is not satisfied by the number of transactions in the group, then a first settlement mechanism is used. However, if the quota is satisfied by the number of transactions in the group, then a second settlement mechanism is used, which is more cost effective than the first settlement mechanism. In this manner, a group of requested transactions may be used to determine the most cost effective manner in which to process a single transaction in that group.

As described above, FIGS. 1, 4 and 5-9 show embodiments of the system of the invention. Further, FIG. 2 shows various steps in accordance with one embodiment of the invention. The processing components that make up the system of the invention may each be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks Such a set of instructions for performing a particular task may be characterized as a program, software program, or simply software.

As noted above, the processing machines execute the instructions that are stored in the memory or memories to process data. This processing of data may be in response to commands by a user or users of the processing machine, in response to previous processing, in response to a request by another processing machine and/or any other input, for example, as are described herein.

As noted above, the processing machine used to implement the invention may be a general purpose computer. However, the processing machine described above may also utilize any of a wide variety of other technologies including a special purpose computer, a computer system including a microcomputer, minicomputer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that a particular processor be one single piece of equipment in one location and that a particular memory be another single piece of equipment in another location. That is, it is contemplated that a processor may be two pieces of equipment in two different physical locations. The two distinct pieces of equipment may be connected in any suitable manner. Additionally, a particular memory may include two or more portions of memory in two or more physical locations.

To explain further, processing performed by the payment optimizer 514 and the other portions as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above might be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example, as well as any of the communication techniques described above. Such communications technologies may use any suitable protocol such as TCP/IP, UDP, or OSL for example.

As described above, a set of respective instructions is used in the processing performed by a particular component in the payment system. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the particular processing machine what to do with data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example.

Further, it is not necessary that a single type of instructions or single programming language be utilized in conjunction with the operation of the systems and methods of the invention. Rather, any number of different programming languages may be utilized as is necessary or desirable. Also, the instructions and/or data used in the practice of the invention may utilize any compression or encryption technique or algorithm, as may be desired.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing components that implement the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example, as well as those arrangements described above.

In the systems and methods of the invention, a variety of "user interfaces" may be utilized to allow a user to interface with the processing machine that is used to implement the invention, i.e., such as the reporting interface 538 and the bank customer interface 550. As used herein, a user interface includes any hardware, software, or combination of hardware and software used by the processing machine that allows a user to interact with the processing machine. A user interface may be in the form of a dialogue screen for example. A user interface may also include any of a touch screen, keyboard, mouse, voice reader, voice recognizer, dialogue screen, menu box, a list, a checkbox, a toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the systems and methods of the invention may interact partially with another processing machine or processing machines, while also interacting partially with a human user.

Accordingly, the foregoing description of the systems and methods of the invention is illustrative. For instance as shown in FIG. 1, while one embodiment of the invention has generally been described in terms of a processor 112 managing the scheduling and optimization of transactions over a network 102, in other embodiments the processor 116 or other intelligent device may be self-contained, for instance in a desktop machine, for instance running a so-called fat client.

In other embodiments with further reference to FIG. 1, an input interface to the payment initiator may be by way of a telephone connection, for instance via a call center facility or a voice response unit (VRU) enabled to communicate with data storage 114 or other elements. Yet further, while the invention has generally been described in terms of scheduled transactions in which the presented bill, payment source and payee all deal in the same currency, in embodiments currency conversions may be performed at appropriate stages of the transaction. Yet further, while the invention has generally been described in terms of electronic fulfillment of scheduled bills, check or other hard copy or other types of payment may be optimized and delivered according to the invention.

Accordingly, it will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system for managing a transmission of funds for a payment request initiator, comprising:
    an input portion that inputs first information from a payment request initiator, the first information including payment source information and payee information, the first information constituting a payment request;
    a payment platform database that includes payment platform data, the payment platform data including decision reference data store; and
    a processor, the processor communicating with the input portion and the payment platform database so as to input the first information and access select payment platform data, the processor:
        identifying a single payment source based on the payment source information, the single payment source being the source of funds for the transmission of funds;
        identifying a payee account based on the payee information;
        performing, after identifying the single payment source and the payee account, an optimization determination to determine a payment mechanism, out of a plurality of available payment mechanisms, to use to transfer the funds from the single payment source to the payee account, the processor using the first information and payment platform data in the optimization determination; and effecting the transmission of funds from the single payment source to the payee account using the payment mechanism;
    wherein the optimization determination includes using a matching algorithm to match the payee account with the payment mechanism;
    wherein the matching algorithm assigns various weighting to the requested transaction based on at least one of address matching, account number matching and name matching, the various weighting then used by the processor as a factor, in determination of the payment mechanism;
    wherein the processor further determining a credit amount associated with the payment request initiator who submits the first information, and using the credit amount in the optimization determination;
    wherein the optimization determination includes using a scoring mechanism that provides a score, the score relating to credit amount, and wherein the processor selects one payment mechanism out of the plurality of available payment mechanisms based on the score accorded to the payment request initiator, the optimization determination further including the scoring mechanism being used to segregate customers into different tiers, such segregation into different tiers used to determine the credit amount to be given to the payment request initiator.

2. The system of claim 1, wherein the identifying a single payment source is performed using a further optimization determination, which is performed before the optimization determination to determine a payment mechanism; and
    the further optimization determination, performed by the processor, determining the single payment source from a plurality of available payment sources.

3. The system of claim 2, wherein the input portion is a computer of the payment request initiator, and the plurality of available payment sources are identified by the payment request initiator.

4. The system of claim 1, wherein in performing the optimization determination, the processor determines that a payment mechanism is exhausted.

5. The system of claim 1, wherein the optimization determination uses a collection of payment requests so as to determine the payment mechanism.

6. The system of claim 5, wherein the optimization determination using a collection of payment requests so as to determine the payment mechanism, includes the processor using quota based processing to determine if at least one quota is satisfied.

7. The system of claim 1, wherein the matching algorithm assigns various weighting to the requested transaction based on each of address matching, account number matching and name matching, the various weighting then used by the processor as a factor, in determination of the payment mechanism.

8. The system of claim 1, Wherein the optimization determination is based on the processor performing an assessment of credit to be given to the payment request initiator.

9. The system of claim 8, wherein the assessment of credit is performed using tiers so as to group payment request initiators, the assessment being performed daily.

10. The system of claim 1, wherein the payment platform data includes affiliation data affiliating the single payment source with a plurality of available payment mechanisms, each of which is respectively usable to transmit the funds from a payment source; and
    the optimization determination, performed by the processor, uses the affiliation data.

11. The system of claim 1, wherein the input portion is an input data store.

12. The system of claim 11, wherein the input portion is a financial payment datastore that stores parameters selected by a user.

13. The system of claim 1, wherein the input portion is an online bill pay datastore.

14. The system of claim 1, wherein the input portion is a user interface that interfaces with a human payment request initiator.

15. The system of claim 1, wherein the decision reference data store includes an affiliation datastore, and the processor obtains updates to information contained therein from at least one affiliation system of record.

16. The system of claim 1, wherein the decision reference data store includes a rules datastore, the rules datastore containing rules that are used by the processor in the optimization determination performed by the processor.

17. The system of claim 1, the processor further including an incoming translator, the incoming translator converting the first information to a form that is understandable by the processor.

18. The system of claim 17, the processor further including an outgoing translator, the outgoing translator converting standardized data generated from the optimization determination performed by the processor to data unique to the payment mechanism selected.

19. The system of claim 18, wherein the processor reconciles the first information with the data that is unique to the payment mechanism selected.

20. The system of claim 1, further including a reporting interface, the reporting interface interfacing with the decision reference datastore.

21. The system of claim 1, the processor further including an audit logging datastore, wherein the audit logging datastore collects data generated from the optimization determination performed by the processor.

22. The system of claim 1, wherein the processor determines an error situation in processing the first information and the payment platform data, the system further including an error logging datastore, the error logging datastore inputting and storing data regarding the error situation.

23. The system of claim 22, further including an exception handling processor, the exception handling processor performing further processing on the first information and the payment platform data for which the error situation is determined.

24. The system of claim 23, wherein the exception handling processor allows for manual intervention.

25. The system of claim 1, wherein the optimization determination performed by the processor provides an optimized situation for a financial institution.

26. The system of claim 1, wherein the optimization determination performed by the processor provides an optimized situation for the payment request initiator.

27. The system of claim 1, wherein the processor determines the available payment mechanisms, out of a set of payment mechanisms, the optimization determination being performed after a determining of the available payment mechanisms.

28. The system of claim 1, wherein the optimization determination performed by the processor includes determining whether a quota has been satisfied for at least one of the available payment mechanisms; and
   if the quota has been satisfied for a particular payment mechanism, then removing the particular payment mechanism from the plurality of available payment mechanisms; and
   if the quota has not been satisfied for a particular payment mechanism, then retaining the particular payment mechanism in the plurality of available payment mechanisms.

29. The system of claim 1, wherein the processor is maintained by a first entity; and
   the first information for respective transactions is input by the processor, the first information for the respective transactions being input from a second entity.

30. The system of claim 29, wherein results of the optimization determination are forwarded to the second entity using a three part message, the three part message including:
   a first part including the first information;
   a second part including information regarding the optimization determination; and
   a third part including information that has been translated for processing by a selected payment mechanism.

31. The system of claim 1, wherein the optimization determination performed by the processor includes the processor basing the optimization determination, at least in part, on the risk associated with each of a plurality of available payment mechanisms.

32. The system of claim 1, wherein the optimization determination performed by the processor includes the processor basing the optimization determination, at least in part, on costs associated with each of a plurality of available payment mechanisms.

33. The system of claim 1, wherein the optimization determination performed by the processor includes the processor basing the optimization determination, at least in part, on contractual minimums relating to volume discounts and the satisfaction of such contractual minimums.

34. The system of claim 33, wherein the optimization determination performed by the processor results in a first payment mechanism being chosen so as to attain a threshold for a volume discount with a first payment entity, and once the threshold for the volume discount is attained, in processing subsequent payment requests, switching to a second payment entity associated with a second payment mechanism different than the first payment mechanism.

35. The system of claim 1, wherein the plurality of available payment mechanisms includes at least two selected from the group including an automated clearing house network, a wire transfer, a remittance process system and an open financial exchange.

36. The system of claim 1, wherein the single payment source comprises one selected from the group consisting of a checking account, other demand deposit account (DDA), money market fund, securities account, stored value account, credit card account, currency account, overdraft line of credit, micro payment account, and line of credit.

37. A system for managing a transmission of funds for a payment request initiator, comprising:
   an input portion that inputs first information from a payment request initiator, the first information including payment source information and payee information, the first information constituting a payment request;
   a payment platform database that includes payment platform data, the payment platform data including decision reference data store; and
   a processor, the processor communicating with the input portion and the payment platform database so as to input the first information and access select payment platform data, the processor:
   identifying a single payment source based on the payment source information, the single payment source being the source of funds for the transmission of funds;
   identifying a payee account based on the payee information;
   performing, after identifying the single payment source and the payee account, an optimization determination to determine a payment mechanism, out of a plurality of available payment mechanisms, to use to transfer the funds from the single payment source to the payee account, the processor using the first information and payment platform data in the optimization determination; and
   effecting the transmission of funds from the single payment source to the payee account using the payment mechanism; and
   wherein the identifying a single payment source is performed using a further optimization determination, which is performed before the optimization determination to determine a payment mechanism; and the further optimization determination, performed by the processor, determining the single payment source from a plurality of available payment sources;
   the input portion is a computer of the payment request initiator, and the plurality of available payment sources are identified by the payment request initiator;
   the optimization determination includes using a matching algorithm to match the payee account with the payment mechanism, the matching algorithm assigns various weighting to the requested transaction based on at least one of address matching, account number matching and name matching, the various weighting then used by the processor as a factor, in determination of the payment mechanism; and
   the payment platform data includes affiliation data affiliating the single payment source with a plurality of available payment mechanisms, each of which is respectively usable to transmit the funds from a payment source; and the optimization determination, performed by the processor, uses the affiliation data; and the processor further determining a credit amount associated with the payment request initiator who submits the first information, and using the credit amount in the optimization determination; and the optimization determination includes using a scoring mechanism that provides a score, the score relating to credit amount, and wherein the processor selects one payment mechanism out of the plurality of available payment mechanisms based on the score accorded to the payment request initiator, the optimization determination further including the scoring mechanism being used to segregate customers into different tiers, such segregation into different tiers used to determine the credit amount to be given to the payment request initiator; and the optimization determination performed by the processor includes the processor basing the optimization determination, at least in part, on the risk associated with each of a plurality of available payment mechanisms.

38. The system of claim 37, wherein the optimization determination performed by the processor includes the processor basing the optimization determination, at least in part, on contractual minimums relating to volume discounts and the satisfaction of such contractual minimums.

39. The system of claim 38, wherein the optimization determination performed by the processor results in a first payment mechanism being chosen so as to attain a threshold for a volume discount with a first payment entity, and once the threshold for the volume discount is attained, in processing subsequent payment requests, switching to a second payment entity associated with a second payment mechanism different than the first payment mechanism.

* * * * *